United States Patent
Jin et al.

(10) Patent No.: US 10,656,745 B2
(45) Date of Patent: May 19, 2020

(54) TOUCH DISPLAY PANEL

(71) Applicant: Shanghai AVIC OPTO Electronics Co., Ltd., Shanghai (CN)

(72) Inventors: Huijun Jin, Shanghai (CN); Zhao keng Cao, Shanghai (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/257,295

(22) Filed: Jan. 25, 2019

(65) Prior Publication Data
US 2019/0155436 A1    May 23, 2019

Related U.S. Application Data

(63) Continuation-in-part of application No. 15/814,504, filed on Nov. 16, 2017, now Pat. No. 10,228,791.

(30) Foreign Application Priority Data

Apr. 28, 2017    (CN) .......................... 2017 1 0292966

(51) Int. Cl.
*G06F 3/041* (2006.01)
*G02F 1/1362* (2006.01)
(Continued)

(52) U.S. Cl.
CPC .......... *G06F 3/0412* (2013.01); *G02F 1/1362* (2013.01); *G02F 1/1368* (2013.01); *G02F 1/13338* (2013.01); *G02F 1/134309* (2013.01); *G02F 1/136209* (2013.01); *G02F 1/136286* (2013.01); *G06F 3/044* (2013.01);
(Continued)

(58) Field of Classification Search
CPC ...... G06F 3/0412; G06F 3/0416; G06F 3/047; G06F 3/044; G06F 3/0446; G06F 3/0443; G09G 2354/00; G09G 2300/0426; G09G 2300/0439; G09G 3/3607; G02F 1/136286; G02F 1/13338; G02F 1/136209; G02F 1/134309; G02F 2001/136222; G02F 2201/121; G02F 2201/123; G02F 1/1368
See application file for complete search history.

(56) References Cited

FOREIGN PATENT DOCUMENTS

| CN | 105609037 A | 5/2016 |
|---|---|---|
| CN | 105929586 A | 9/2016 |

OTHER PUBLICATIONS

First CN Office Action dated Apr. 2, 2019 for corresponding CN Application No. 201710292966.0.

*Primary Examiner* — Charles V Hicks
(74) *Attorney, Agent, or Firm* — Tarolli, Sundheim, Covell & Tummino LLP

(57) ABSTRACT

Disclosed is a touch display panel, including an array substrate and a color film substrate, the array substrate includes a plurality of sub-pixels, a ratio of a long edge to a short edge of the sub-pixel is M:1, the long edge of the sub-pixel extends along the second direction and the short edge of the sub-pixel extends along a first direction, M' is a rounding off integer of M, N color resistors are arranged on the color film substrate and corresponding to the sub-pixels, M' and N are natural numbers greater than 1; the array substrate further includes a plurality of block-shaped common electrodes, each of the common electrodes overlaps with k*Z sub-pixels in the first direction, k is a positive integer, and Z is a least common multiple of M' and N.

20 Claims, 33 Drawing Sheets

(51) Int. Cl.
    *G02F 1/1333*     (2006.01)
    *G02F 1/1343*     (2006.01)
    *G06F 3/047*     (2006.01)
    *G06F 3/044*     (2006.01)
    *G02F 1/1368*     (2006.01)
    *G09G 3/36*     (2006.01)

(52) U.S. Cl.
    CPC ............ G06F 3/047 (2013.01); G06F 3/0416 (2013.01); G06F 3/0443 (2019.05); G06F 3/0446 (2019.05); *G02F 2001/136222* (2013.01); *G02F 2201/121* (2013.01); *G02F 2201/123* (2013.01); *G09G 3/3607* (2013.01); *G09G 2300/0426* (2013.01); *G09G 2300/0439* (2013.01); *G09G 2354/00* (2013.01)

TOUCH DISPLAY PANEL

CROSS-REFERENCE TO RELATED APPLICATIONS

The present application is a continuation-in-part of U.S. patent application Ser. No. 15/814,504, filed on Nov. 16, 2017, which claims the benefit of priority to Chinese Patent Application No. 201710292966.0, filed on Apr. 28, 2017. The afore-mentioned patent applications are hereby incorporated by reference in their entireties.

TECHNICAL FIELD

The present disclosure relates to the field of display technologies and, in particular, to a touch display panel.

BACKGROUND

Liquid crystal display (LCD) devices have been widely applied to laptops, tablet PCs, smart phones and the like, due to advantages such as portability and low power consumption.

The liquid crystal display device achieves image display through a block of liquid crystal display panel. Generally, the liquid crystal display panel includes an array substrate and a color film substrate, the array substrate and the color film substrate are arranged opposite to each other, and fitted together through a sealing adhesive provided at the non-display area of the array substrate and the color film substrate, so as to form an internal accommodating space for accommodating the liquid crystal layer. A pixel electrode and a common electrode which form an electric field are formed on the array substrate. When a voltage is applied to the two electrodes, a driving electric field is formed in the internal accommodating space, the electric field can drive the liquid crystal molecules to rotate. Since the liquid crystal molecules have the property of optical rotation, when cooperating with the arrangement of a polarizing piece, the light passing through the liquid crystal display device can present different gray scales, so as to achieve image display.

Normally, a LCD device is provided with an input device, so that a user can use a finger or a touch pen to directly input information to the touch display panel of the screen of a navigation device, a portable terminal, a smart phone and the like.

In the related art, since the LCD device is generally formed by a touch display panel and a liquid crystal panel, then the LCD device has a large total thickness, thus the manufacturing process is complicated, and the cost is high.

The related art also provides a display device having integrated the touch function and the display function. However, since the touch function and the display function are integrated, it is needed to perform display frame debug and detection as well as touch electrode debug and detection, but these two detection frames adopt different driving manners. As a result, the debug process shall be performed separately, which increases the debug time.

SUMMARY

In view of the above, the present disclosure provides a touch display panel, including: an array substrate, the array substrate including: a first glass substrate, a plurality of scan lines extending along a first direction, a plurality of data lines extending along a second direction, wherein two adjacent scan lines intersect with two adjacent data lines to define a sub-pixel with a ratio of a long edge to a short edge being M:1, the long edge of the sub-pixel extends along the second direction and the short edge of the sub-pixel extends along the first direction; adjacent M' sub-pixels along the first direction constitute a pixel group, M' is a rounding off integer of M, and M' is a natural number greater than 1, and a plurality of common electrodes each being block-shaped and arranged in an In matrix, wherein each of I and J is a natural number greater than or equal to 2, each of the plurality of common electrodes is correspondingly connected to at least one touch electrode wiring, and each of the plurality of common electrodes is connected to a touch drive circuit by the at least one touch electrode wiring; and a color film substrate, the color film substrate including: a second glass substrate, a black matrix including a plurality of open areas, each of the plurality of open areas corresponding to a respective sub-pixel, and a plurality of color resistors including N colors, overlapping the plurality of open areas, and arranged along the first direction; wherein the color resistors with N colors are alternatively arranged, N is a natural number greater than 1, wherein each of the plurality of common electrodes overlaps with k*Z sub-pixels in the first direction, k is a positive integer, and Z is a least common multiple of M' and N.

The touch display panel provided by the present disclosure can adopt a drive frame to achieve touch detection and display detection at the same time, which saves detecting and debug time.

DESCRIPTION OF EMBODIMENTS

In order to make the above objects, features and advantages of the present disclosure easier to understand, the present disclosure will be illustrated in further detail with reference with to the embodiments and the accompanying drawings.

It should be noted that, the present disclosure will be more clearly understood by the details illustrated as follows. However, the present disclosure shall also be implemented in a variety of other manners rather than those described as follows, those skilled in the art can make modifications, replacements without departing from the essence of the present disclosure. Therefore, the present disclosure will not be limited by the embodiments disclosed as follows.

Figure 1:
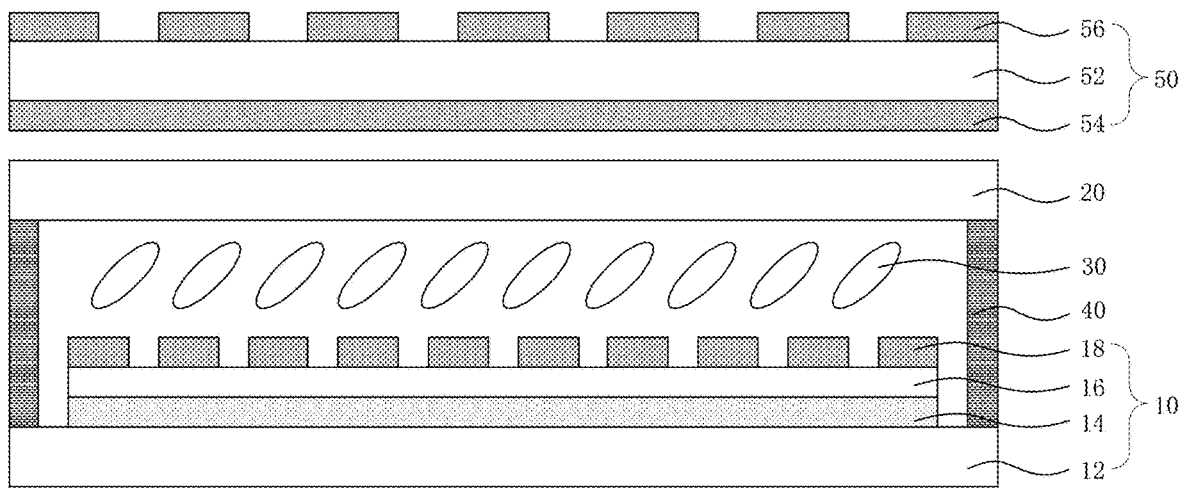
FIG. 1 illustrates a cross-sectional view of a touch display panel in the related art.

FIG. 1 illustrates a cross-sectional view of a touch display panel in the related art. As shown in FIG. 1, the touch display panel in the related art includes a liquid crystal panel and a touch display panel 50. Further, the liquid crystal panel includes an array substrate 10, a color film substrate 20. A sealing adhesive 40 is placed at a periphery of the array substrate 10 and the color film substrate 20, so as to fit the array substrate 10 and the color film substrate 20 together. A liquid crystal layer 30 is placed in an accommodating space defined by the array substrate 10, the color film substrate 20 and the sealing adhesive 40. Further, the array substrate 10 includes a glass substrate 12. A first electrode layer 14 and a second electrode layer 18 are arranged on the glass substrate 12. An insulation layer 16 is arranged between the first electrode layer 14 and the second electrode layer 18, so that the first electrode layer 14 and the second electrode layer 18 are insulated from each other. When the first electrode layer 14 and the second electrode layer 18 are respectively applied with a drive voltage, an electric field driving the liquid crystal in the liquid crystal layer 30 to rotate is formed between the first electrode layer 14 and the second electrode layer 18, so as to achieve display function.

The touch display panel 50 is formed on the upper surface of the liquid crystal panel, so as to sense touching of the user. The touch display panel 50 includes a touch substrate 52, a first sensing electrode 54 on a lower surface of the touch substrate 52 and a second sensing electrode 56 on an upper surface of the touch substrate 52. The first sensing electrode 54 includes a plurality of strip electrodes extending along the first direction, and the second sensing electrode 56 includes a plurality of strip electrodes extending along the second direction. The first direction and the second direction are perpendicular to each other. If the user touches a preset location, at the touched location, that is, the intersecting position of the strip electrodes of the first sensing electrode 54 and the second sensing electrode 56, the capacitance between the two electrodes will change. Therefore, the touch position of the user can be determined through sensing the position where the capacitance is changed.

However, since the LCD device in the related art is a structure formed by arranging the touch display panel 50 on the upper surface of the liquid crystal panel, which will cause increase of the total thickness of the elements, complicated manufacturing process and increase of cost. The related art also provides a solution that a touch function is integrated in the display panel. For example, patent CN103926729A (US family patent US2015185902A1) discloses a display device having integrated the touch function. In the display device, the common electrode is divided into a plurality of common electrodes arranged in a matrix, each common electrode is connected to the drive circuit through a signal line. In the touch process, a touch signal is input into the common electrode by the drive electrode, and the touch position can be detected by the change of the self-capacitance of each common electrode; in the display process, a common signal is applied to all the common electrodes, then all the common electrodes have a same voltage, thereby an electric field can be formed between the common electrode and the pixel electrode in the pixel unit, so as to drive the liquid crystal molecules in the liquid crystal layer to rotate. Therefore, the integration of touch function and display function is achieved, thereby solving the technical problems of overlarge total thickness and complicated manufacturing process. However, since the touch function and the display function are integrated, it is needed to perform display frame debug and detection as well as touch electrode debug and detection, but these two detection frames adopt different driving manners. As a result, the debug process shall be performed separately, which increases the debug time.

Figure 2:
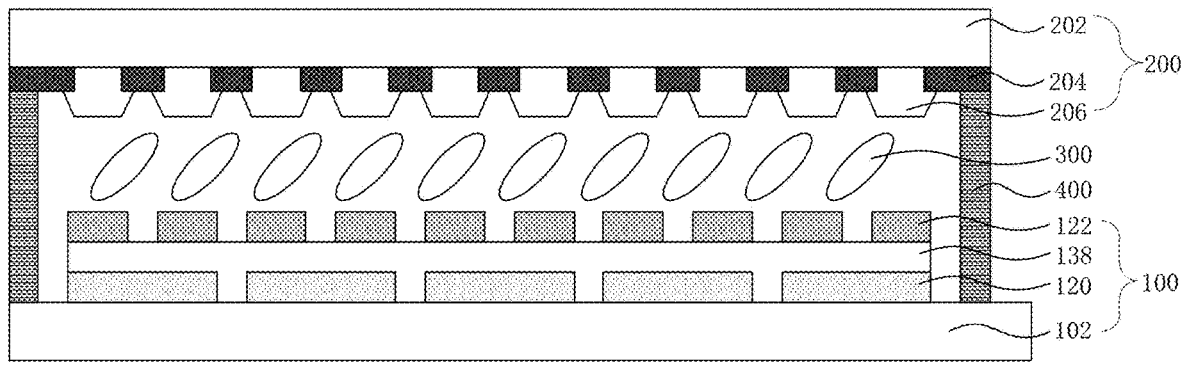
FIG. 2 illustrates a cross-section view of a touch display panel according to an embodiment of the present disclosure.
Figure 3:
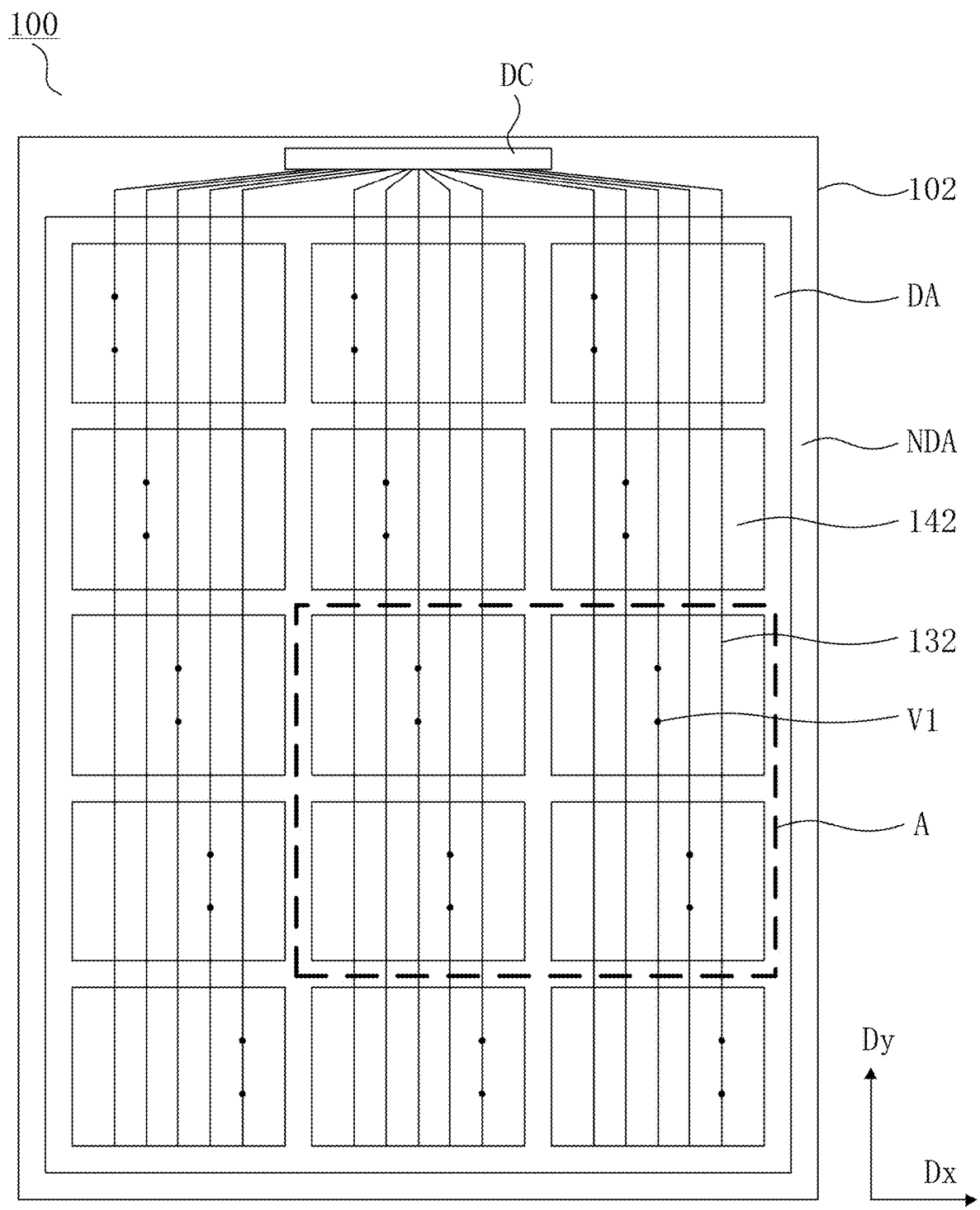
FIG. 3 illustrates a top view of a touch display panel according to an embodiment of the present disclosure.
Figure 4:
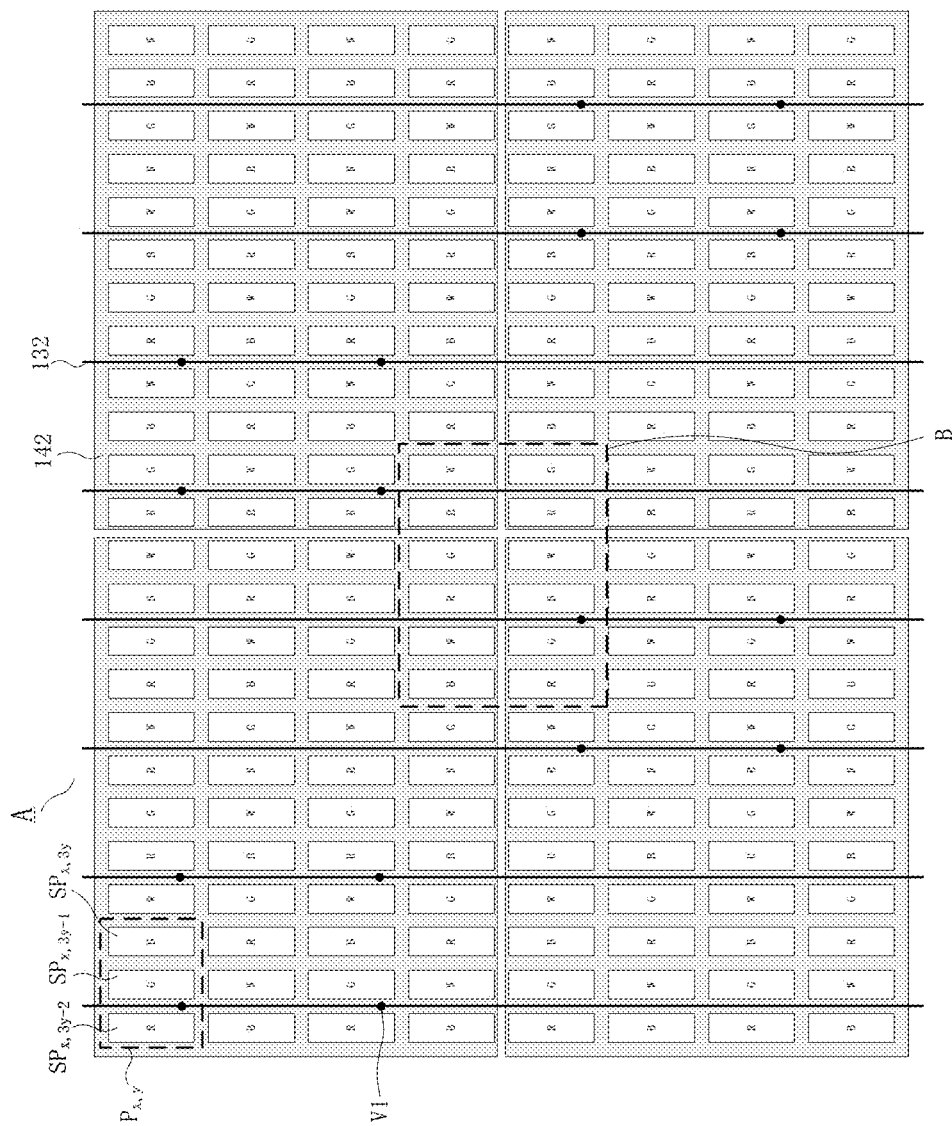
FIG. 4 illustrates an enlarged structural schematic diagram of area A in FIG. 3.
Figure 5:
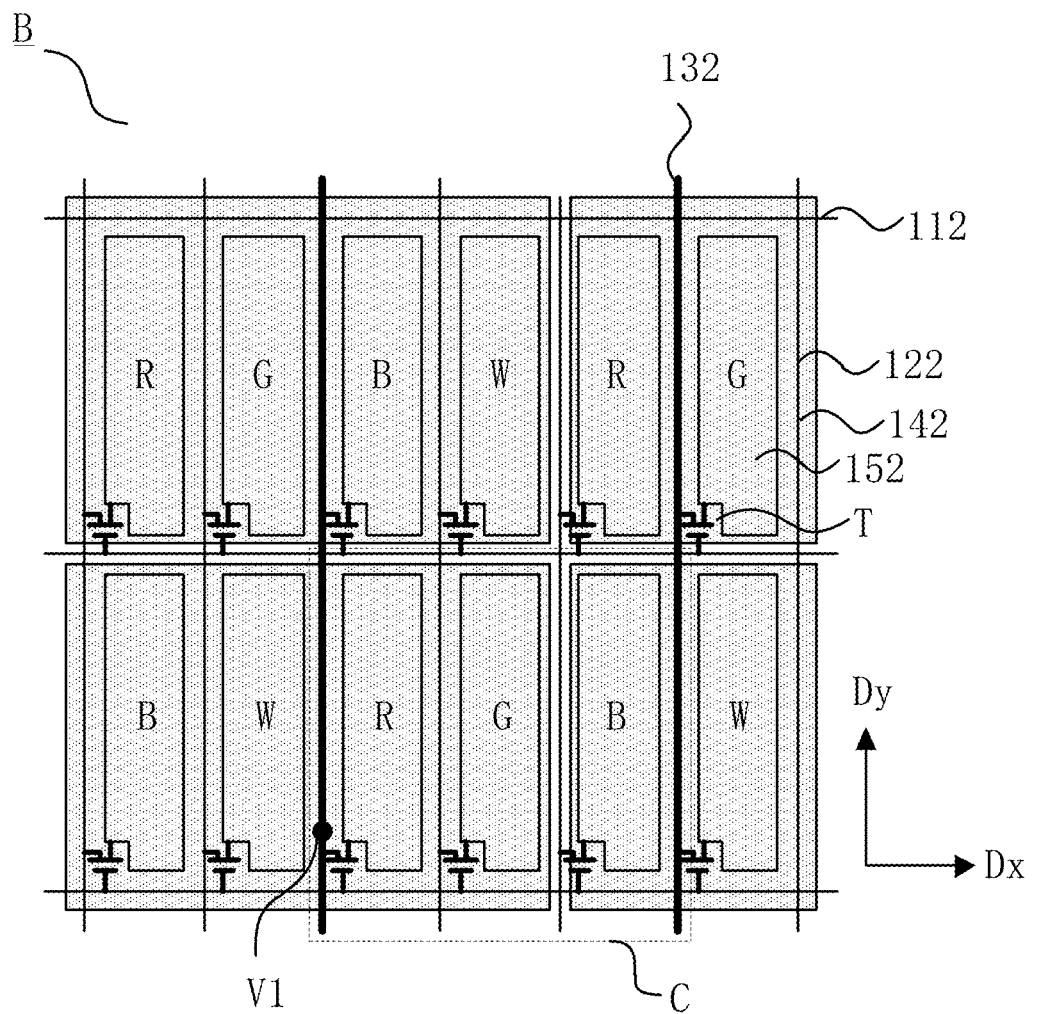
FIG. 5 illustrates an enlarged structural schematic diagram of area B in FIG. 4.
Figure 6:
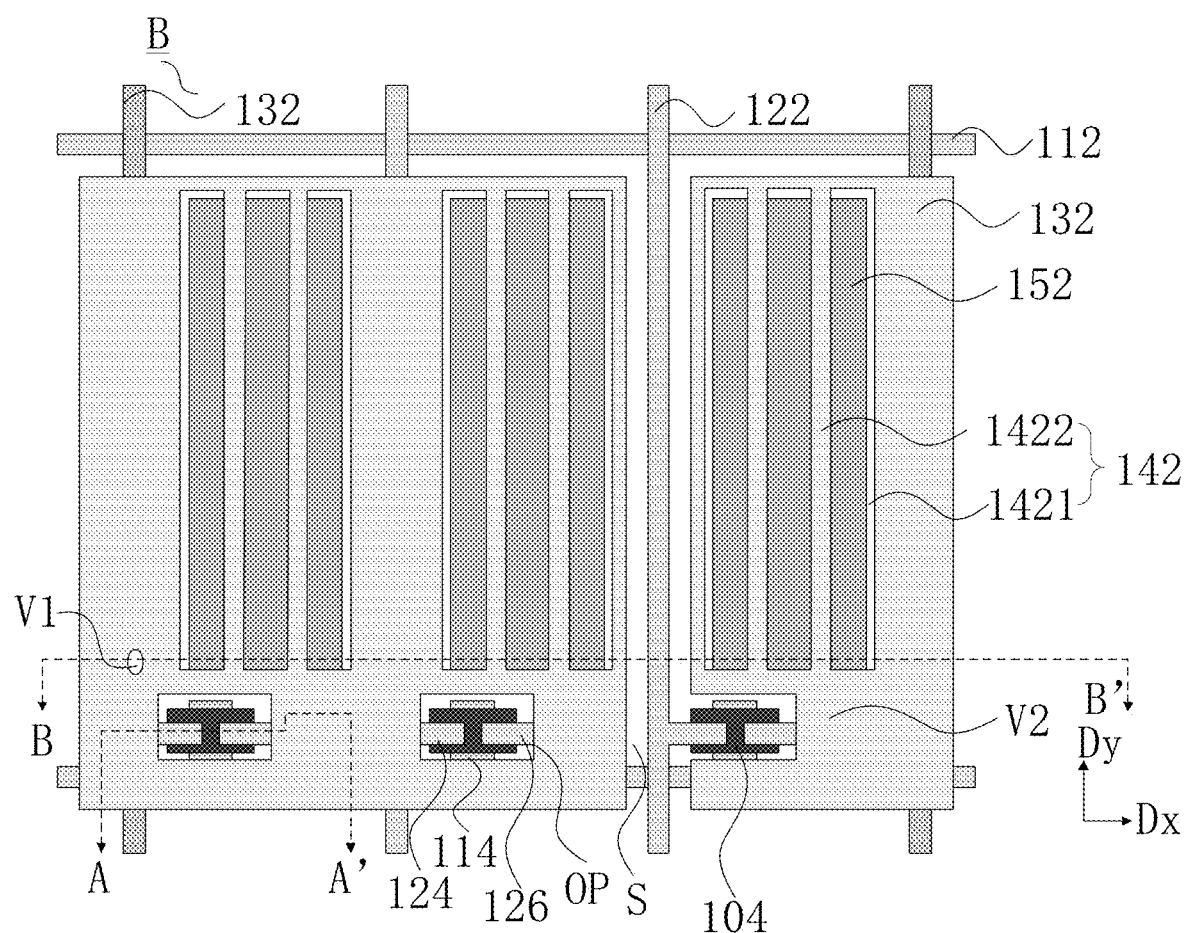
FIG. 6 illustrates an enlarged structural schematic diagram of area C in FIG. 5.
Figure 7A:
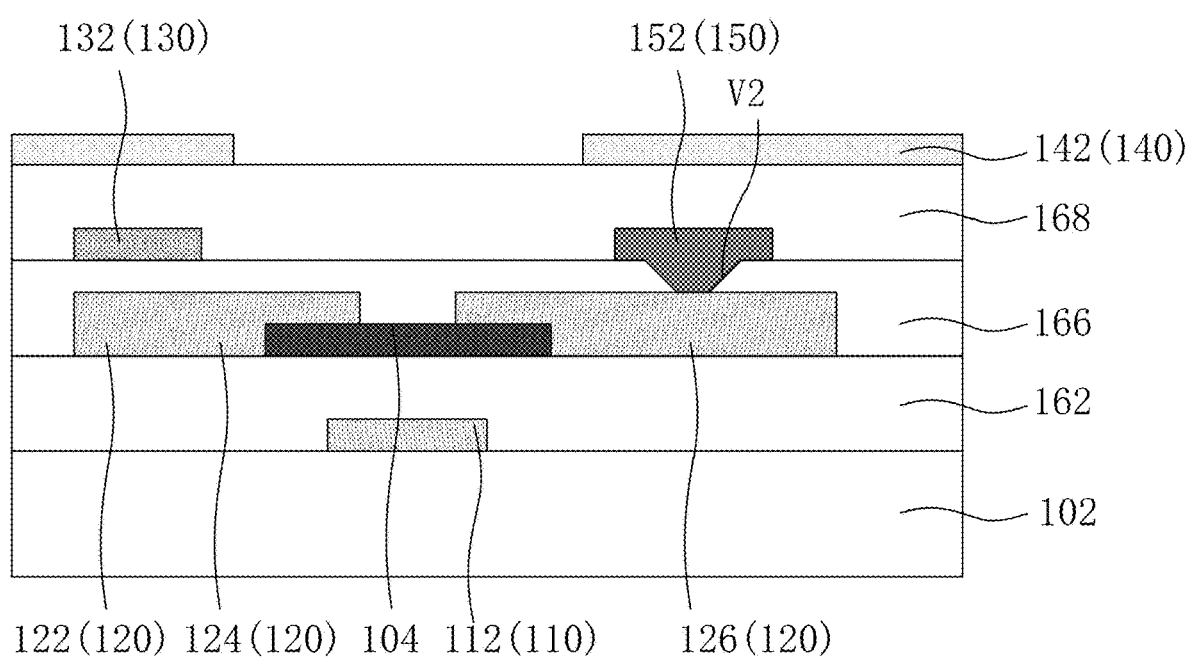
FIG. 7*a* illustrates a cross-sectional structural schematic diagram of AA' section in FIG. 6.
Figure 7B:
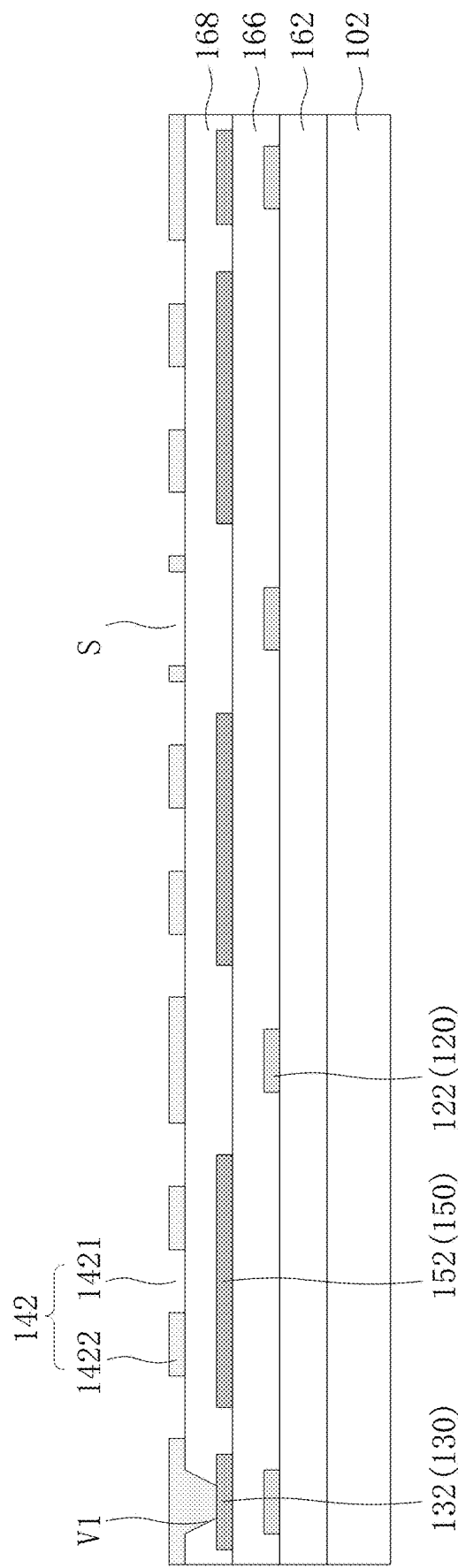
FIG. 7*b* illustrates a cross-sectional structural schematic diagram of BB' section in FIG. 6.

Please refer to FIGS. 2-6, FIG. 7a and FIG. 7b, FIG. 2 illustrates a cross-section view of a touch display panel according to an embodiment of the present disclosure; FIG. 3 illustrates a top view of a touch display panel according to an embodiment of the present disclosure; FIG. 4 illustrates an enlarged structural schematic diagram of area A in FIG. 3; FIG. 5 illustrates an enlarged structural schematic diagram of area B in FIG. 4; FIG. 6 illustrates an enlarged structural schematic diagram of area C in FIG. 5; FIG. 7a illustrates a cross-sectional structural schematic diagram of AA' section in FIG. 6; FIG. 7b illustrates a cross-sectional structural schematic diagram of BB' section in FIG. 6. In order to clearly describe the structure of the touch display panel provided by the embodiments of the present disclosure, a part of the structure may be omitted in some figures, however, the present disclosure shall not be interpreted as being limited thereon.

The touch display panel provided by an embodiment of the present disclosure includes an array substrate 100 and a color film substrate 200, the array substrate 100 and the color film substrate 200 are fitted together by a sealing adhesive 400. The sealing adhesive 400 is placed at a periphery of the color film substrate 200. A side of the first glass substrate 102 of the array substrate 100 is slightly larger than the second glass substrate 202 of the color film substrate 200, so as to form a step portion. A drive circuit or a drive chip can be placed on the step portion. The array substrate 100, the color film substrate 200 and the sealing adhesive 400 cooperatively form a sealed space, and a liquid crystal layer 300 is placed in the sealed space. Further, the touch display panel of the present embodiment includes a display area DA and a non-display area NDA, the non-display area NDA surrounds the display area DA, and the sealing adhesive 400 is placed at the non-display area NDA of the touch display panel. The non-display area NDA further includes a step area, and a touch drive circuit DC is placed on the step area.

The array substrate 100 includes a first glass substrate 102, a plurality of scan lines 112 and a plurality of data lines 122. The scan lines 112 extend along a first direction Dx, and the data lines 122 extend along a second direction Dy. In the present embodiment, a first metal layer and a second metal layer are placed above a surface of a side of the first glass substrate 102 facing the color film substrate 200, the scan lines 112 are placed in the first metal layer, and the data lines 122 are placed in the second metal layer. Two adjacent scan lines 112 and two adjacent data lines 122 intersect with each other to define a sub-pixel SP. A plurality of sub-pixels SP is arranged in a matrix, a row direction of the matrix is the first direction Dx, and a column direction of the matrix is the second direction Dy.

The length-width ratio of the sub-pixel SP is M:1, M' adjacent sub-pixels SP along the first direction Dx constitute a pixel group P, M' is a rounding off integer of M, and M' is a natural number greater than 1. That is, M' is determined by rounding off M. For example, if 2.5≤M<3.5, then after rounding off, M' is 3. Referring to FIG. 4 and FIG. 5, two adjacent scan lines 112 and two adjacent data lines 122 intersect with each other to define a sub-pixel SP, the ratio of the long edge to the short edge of the sub-pixel SP is 3:1, that is, in the present embodiment, M=3 and M'=3. In a display process, color is displayed in the pixel as a basic unit, but in an image segmentation process, the pixel is typically a square. Since the ratio of the long edge to the short edge of the sub-pixel SP is M:1, and after rounding off is M':1 (in the present embodiment, 3:1), M' sub-pixels SP along a short edge direction of the sub-pixel should constitute a pixel group P, so as to display a mixed color. In the present embodiment, a long edge of the sub-pixel SP extends along an extending direction of the data line 122, i.e., the second direction Dy, and the short edge of the sub-pixel SP extends along an extending direction of the scan line 112, i.e., the first direction Dx. Three adjacent sub-pixels SP along the first direction Dx constitute a pixel group. In the present embodiment, each pixel group $P_{x,y}$ includes three sub-pixels, $SP_{x,3y-2}$, $SP_{x,3y-1}$ and $SP_{x,3y}$, wherein x, y are positive integers greater than 1. In other embodiments of the present disclosure, M' can also be other values, for example, M'=2, or M'=4.

It should be noted that, during practical manufacture process, due to the processing error, the finally obtained ratio of the long edge to the short edge of the sub-pixel may be deviated. For example, the ratio of the long edge to the short edge of the sub-pixel is defined to be 3:1, however, the finally manufactured product presents a ratio of 2.8:1, or 2.9:1 or 3.1:1, or 3.2:1 etc. Although there may be processing error, the principle of "in an image segmentation process, the pixel is typically a square" described as above will not be influenced, the pixel is substantially a square means that a tolerant error is acceptable within a certain range. Moreover, in a final product, some of the errors of the ratio are positive errors, and some are negative errors, then the positive and negative errors can compensate each other.

Figure 16:
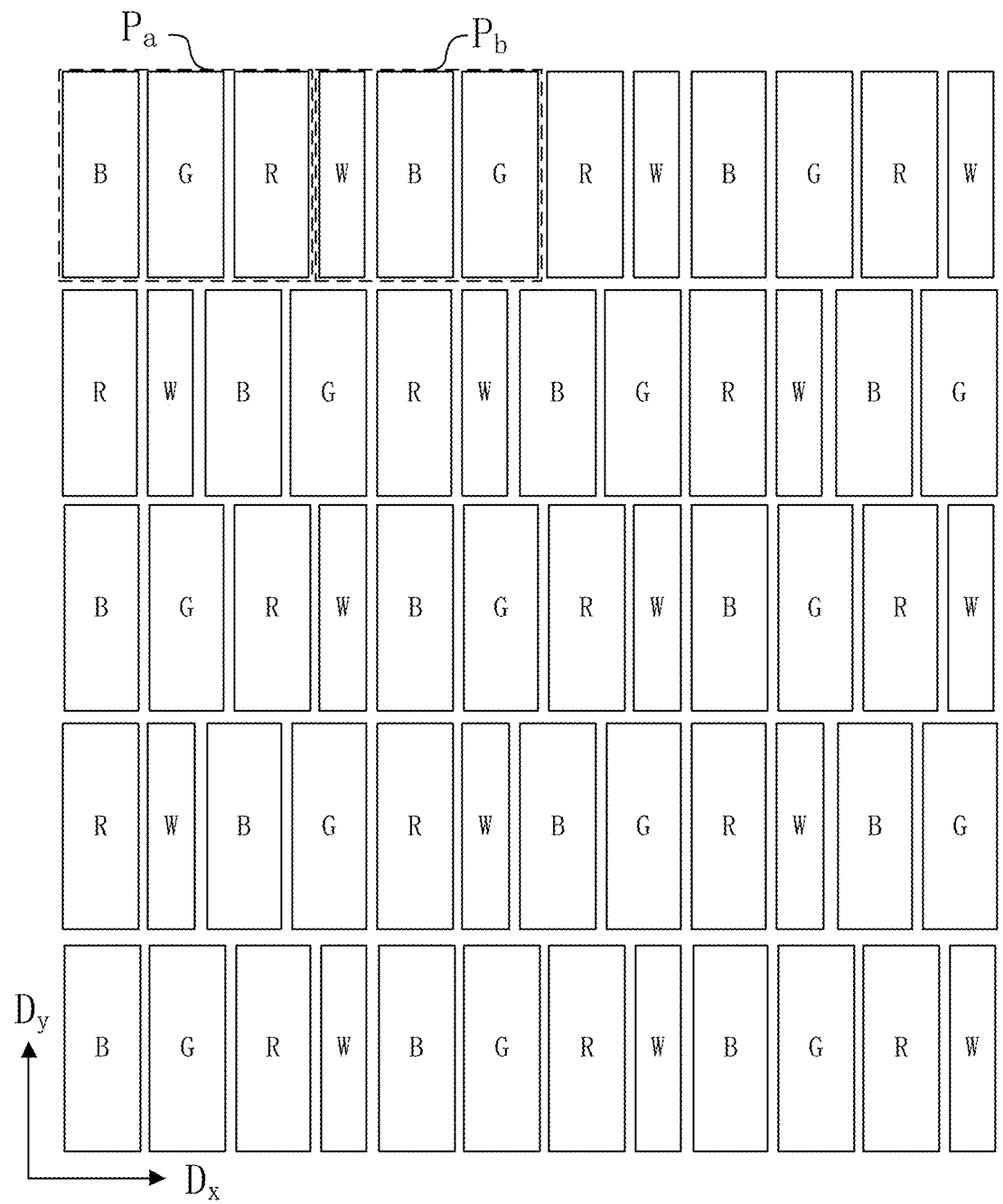
FIG. 16 illustrates a schematic diagram of a pixel arrangement of another touch display panel according to an embodiment of the present disclosure.

In one embodiment, adjacent pixels can be pixels respectively having a positive error and a negative error. The pixel having the negative error refers to a pixel with a ratio of its length in an extending direction of the data line to its length in an extending direction of the scan line being smaller than 1, and the pixel having the positive error refers to a pixel with a ratio of its length in an extending direction of the data line to its length in an extending direction of the scan line being greater than 1. Please refer to FIG. 16, the pixels have two types of shapes, one type is $P_a$, the other type is $P_b$. The length of $P_a$ is greater than the length of $P_b$ in the extending direction of the scan line D, so that pixel $P_a$ has a ratio of its length in an extending direction of the data line to its length in an extending direction of the scan line being regarded as a negative error, and pixel $P_b$ has a ratio of its length in an extending direction of the data line to its length in an extending direction of the scan line being regarded as a positive error, then pixels $P_a$ and $P_b$ can compensate each other.

A thin film transistor T and a pixel electrode 152 are further placed in each sub-pixel SP area. One thin film transistor T is placed in each sub-pixel SP area. The thin film transistor T includes a gate electrode 114, a semi-conductor 104, a source electrode 124 and a drain electrode 126. The gate electrode 114 of the thin film transistor T is connected to a corresponding scan line 112, the source electrode 124 of the thin film transistor T is connected to a corresponding data line 122, and the drain electrode 126 of the thin film transistor is connected to a pixel electrode 152 located in the sub-pixel SP area. After the scan line 112 is applied with a start voltage, the semi-conductor 104 placed on the gate electrode 114 is turned on, at this time, signal transmission function is enabled, then a signal is transmitted from the data line 112 to the pixel electrode 152 electrically connected to the drain electrode 126.

The array substrate 100 further includes a plurality of block-shaped common electrodes 142 placed in an In matrix, wherein I and J are natural numbers larger than or equal to 2. A row direction of the matrix is the first direction Dx, and a column direction of the matrix is the second direction Dy. Each common electrode 142 is correspondingly connected to at least one touch electrode wiring 132, each common electrode 142 is connected to the touch drive circuit DC by the touch electrode wiring 132. In the present embodiment, the common electrode 142 is placed at a surface of a side of a first transparent substrate 102 facing the color film substrate 200. The common electrode 142 is a rectangular common electrode, any two common electrodes 142 are insulated from each other. The common electrode 142 is located in a first electrode layer, the first electrode layer can be a transparent conductive layer. Adjacent block-shaped common electrodes 142 are insulated from each other by a slit S. The slit S is defined between two adjacent sub-pixels SP, the width of the slit S can be slightly larger than the width of the data line 122, or slightly smaller than the width of the data line 122, or equal to the width of the data line 122 as well. In the display process, a common voltage is applied to each common electrode 142, thus an electric field is formed between the common electrode 142 and the pixel electrode arranged in the sub-pixel for driving liquid crystal molecules in the drive liquid crystal layer 300 to rotate. In the touch process, a touch signal is applied to each common electrode 142, a touching position can be detected by detecting a self-capacitance change of each common electrode 142 transmitted to the touch drive circuit DC.

Referring to FIGS. 2-6, 7a, and 7b, in the present embodiment, the touch display panel includes a first metal layer 110 arranged on the first glass substrate 102, a gate electrode insulation layer 162, a second metal layer 120, a first passivation layer 166, a third metal layer 130, a first electrode layer 140, a second electrode layer 150, and a interelectrode insulation layer 168. The first metal layer 110 includes a scan line 112. The first metal layer 110 can be directly arranged at a surface of a side of the first glass substrate 102 facing the color film substrate 200. The first metal layer 110 can be obtained by a patterning step after physically depositing a first metal material layer. The patterning process can be obtained by process steps of depositing an optical resist, exposure, developing, etching and peeling in the related art, which will not be repeated herein. The first metal layer 110 further includes a gate electrode 114. In some other embodiments of the present disclosure, the first metal layer 110 can further include a common electrode line, a signal wiring located in the non-display area and the like. If the first metal layer 110 includes a common electrode line, then the common electrode line is electrically connected to the common electrode 142 by passing through a through hole of the insulation layer between the first metal layer and a layer where the common electrode is located, so as to reduce a resistance of the common electrode.

The gate electrode insulation layer 162 is arranged on the first metal layer 110, and the semi-conductor layer 104 is arranged on the gate electrode insulation layer 162. The gate electrode insulation layer 162 is located between the first metal layer 110 where the gate electrode 114 is located and the semi-conductor layer 104, so that the semi-conductor layer 104 and the first metal layer 110 are insulated from each other. The semi-conductor layer 104 is formed above each gate electrode 114 of each thin film transistor T. In the present embodiment, the semi-conductor layer 104 is an amorphous silicon semi-conductor layer, and the preparation method of the semi-conductor layer 104 is same as those in the related art, which will not be repeated herein.

The second metal layer 120 is arranged on the semi-conductor layer 104, the second metal layer 120 includes the data line 122. Further, the second metal layer 120 further includes the source electrode 124 and the drain electrode 126 of the thin film transistor T. In some other embodiments of the present disclosure, the second metal layer 120 can also include the signal wiring located in the non-display area. The patterning manner of the second metal layer 120 is same as those in the related art, which will not be repeated herein.

A first passivation layer 166 is arranged on the second metal layer 120, a second through hole V2 is defined in the first passivation layer 166 corresponding to the drain electrode 126, so as to expose a part of the drain electrode 126. In an embodiment of the present disclosure, the first passivation layer 166 is an insulation layer located on the second metal layer 120, configured to insulate the second metal layer 120 from the conductive film layer located on the second metal layer 120.

A third metal layer 130 is arranged on the first passivation layer 166, and the third metal layer 130 includes a touch electrode wiring 132.

A second electrode layer 150 is arranged on the first passivation layer 166, and the second electrode layer 150 includes a pixel electrode 152.

A interelectrode insulation layer 168 is arranged on the second electrode layer 150.

The first electrode layer 140 is arranged on the interelectrode insulation layer 168, and the first electrode layer 140 includes a common electrode 142.

The first electrode layer 140 and the second electrode layer 150 are both transparent conductive layers, two electrode layers are insulated from each other by the interelectrode insulation layer 168. The structure of the present embodiment is a top common electrode structure, that is, the common electrode 142 is located at one side of the pixel electrode 152 away from the first glass substrate 102. The pixel electrode 152 is formed in a range of each sub-pixel P, and the pixel electrode is electrically connected to the drain electrode 126 of the thin film transistor T through the second through hole V2 in the first passivation layer 166, a part of the drain electrode is exposed through the second through hole V2, and the pixel electrode receives pixel electrode signals from the data line 122 by the thin film transistor T. In an embodiment of the present disclosure, the second through hole V2 is a through hole for connecting the pixel electrode 152 to the drain electrode 126 of the thin film transistor T. Each common electrode 142 is electrically connected to a touch electrode wiring 132. The third metal layer 130 where the touch electrode wiring 132 is located and the first electrode layer 140 where the common electrode 142 is located are respectively arranged at two sides of the interelectrode insulation layer 168, the common electrode 142 is electrically connected to the touch electrode wiring 132 through the first through hole V1 penetrating through interelectrode insulation layer 168. In an embodiment of the present disclosure, the first through hole V1 is a through hole for connecting the touch electrode wiring 132 to the common electrode 142. Since each common electrode 142 is respectively connected to one touch electrode wiring 132, thus, in the touch process, the touch drive circuit DC applies a touch signal to each common electrode by each touch electrode wiring 132, by detecting the magnitude and change of the self-capacitance of each common electrode 142, the touch position can be detected, so as to achieve touch detection. In the display process, the drive circuit DC applies a common electrode signal to each common electrode by the touch electrode wiring 132 at the same time, so as to form an electric field between the common electrode 142 and the pixel electrode 152 for driving the liquid crystal molecules in the liquid crystal layer 300 to rotate, thereby achieving display function.

In the present embodiment, each common electrode 142 is electrically connected to a touch electrode wiring 132 through two first through holes V1. However, this is only exemplary, since the common electrode is made of a transparent conductive material, but the touch electrode wiring is made of a metal conductive material, in order to reduce the contact resistance between the common electrode and the touch electrode wiring, the number of touch hole between each touch electrode wiring and the common electrode can be increased, so as to increase the contact area. Or, each common electrode can be electrically connected to the touch drive circuit DC by a plurality of touch electrode wirings. In addition, at the position corresponding to each common electrode 142, a plurality of redundant touch electrode wirings can be arranged, the redundant touch electrode wiring is electrically connected to a corresponding common electrode, and is electrically insulated from other common electrodes, so as to further reduce the signal transmission resistance of the common electrode wiring.

In the present embodiment, each touch electrode wiring 132 is located above the data line 122, and a projection of the touch electrode wiring 132 on the first glass substrate 102 overlaps with a projection of the data line 122 on the first glass substrate 102. In such a structure, it is unnecessary to provide extra wiring space for the touch electrode wiring, which avoids influence on an aperture ratio of the sub-pixel. In the range of each sub-pixel P, the common electrode 142 includes a plurality of strip common electrodes 1422 and a plurality of strip common electrode slits 1421. An fringe electric field can be formed between the strip common electrode 1422 and the pixel electrode 152, so as to drive the liquid crystal molecules to rotate. A storage capacitance can be formed at a direct facing area between the strip common electrode 1422 and the pixel electrode 152, so as to improve the stability of the liquid crystal capacitance. In order to expand the viewing angle, the strip common electrode 1422 can be arranged to be of a V-shaped structure, so as to form a dual-domain structure, which facilitates the liquid crystal molecules located at different areas of the dual-domain to rotate toward different directions. Further, in order to reduce trace mura, corners are placed on opposite ends of the strip common electrode 1422, so as to strengthen the electric field at end areas of the strip common electrode 1422, thereby improving the driving performance of the electric field in the areas.

Figure 7C:
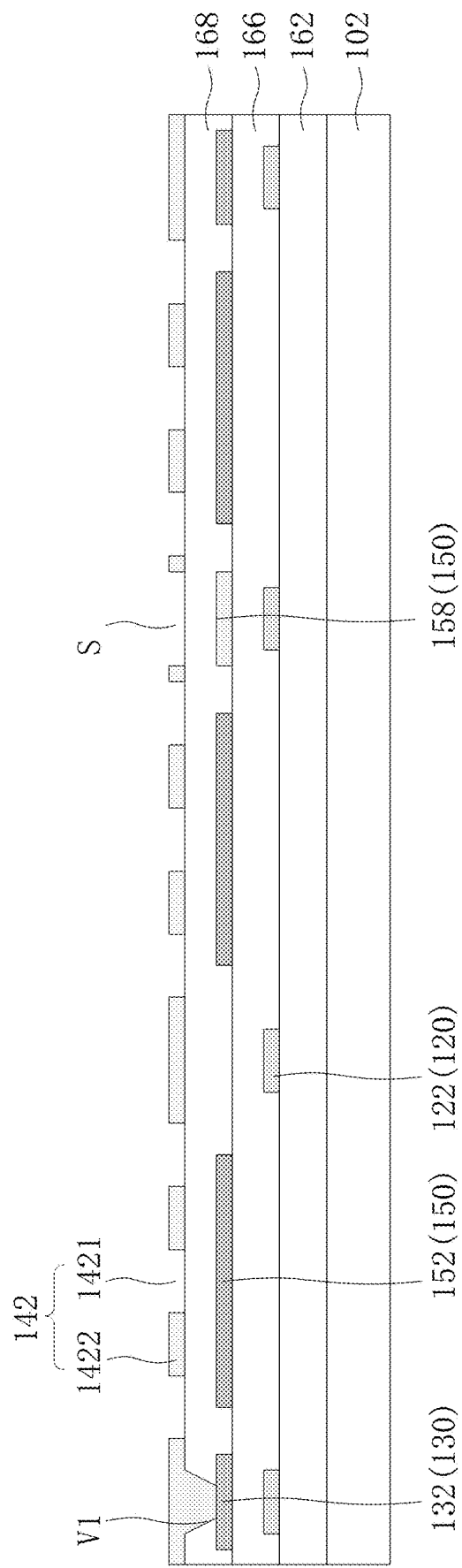
FIG. 7*c* illustrates another cross-sectional structural schematic diagram of BB' section in FIG. 6.

The slit S between adjacent common electrodes 142 is located above one data line 122, the area can be sheltered by a black matrix on the color film substrate 200, which can avoid the slit between the common electrodes from being formed between the opening areas of the pixel, so as not to influence display. Since no slit is defined in one single common electrode above the data line 122, the common electrode above the data line 122 can shelter the parasitic capacitance on the data line 122. Due to the existence of the slit S between the adjacent common electrodes, the parasitic capacitance on the data line 122 may interfere the liquid crystal molecules in the liquid crystal layer 300, therefore, an auxiliary electrode can be arranged at the position corresponding to the slit S between the common electrodes. FIG. 7c illustrates another cross-sectional structural schematic diagram of BB' section in FIG. 6. In FIG. 7c, the auxiliary electrode 158 is provided, the auxiliary electrode 158 can be electrically connected to a bus of the common electrode, so as to receive the common electrode signal. The auxiliary electrode 158 can shelter the parasitic capacitance of the data line 122, and also can strengthen the electric field at the slit S. The auxiliary electrode 158 can be located at the second electrode layer 150, which will not bring additional processes.

Referring to FIGS. 2-6, the touch display panel provided by the present embodiment further includes a color film substrate 200. The color film substrate 200 includes: a second glass substrate 202; a black matrix 204 including a plurality of open areas, the open areas and the sub-pixel are in one-to-one correspondence; a plurality of color resistors overlapping the plurality of open areas. Referring to FIG. 2, a black matrix 204 is placed on a surface of a side of the second glass substrate 202 facing the array substrate 100, and the black matrix 204 includes the plurality of open areas. The plurality of the open areas and the plurality of the sub-pixels SP on the array substrate 100 are in one-to-one correspondence. Since the plurality of sub-pixels SP on the array substrate 100 is arranged in an array, the plurality of the open areas of the black matrix 204 is also arranged in an array, while the black matrix 204 is wholly distributed in a grid structure. A color resistor 206 is arranged in the open area of the black matrix 204, and the color resistor 206 includes a plurality of colors, for example, a red color resistor, a green color resistor and a blue color resistor. In the present embodiment, there are four types of color resistor, including: red color resistor R, green color resistor G, blue color resistor B and white color resistor W.

Referring to FIG. 4 and FIG. 5, a plurality of color resistors arranged along the first direction Dx includes N colors, and the color resistors of the N colors are sequentially and alternatively arranged in circulation. In the present embodiment, a plurality of color resistors arranged along the first direction Dx includes 4 colors, that is, N=4, which includes a red color resistor R, a green color resistor G, a blue color resistor B and a white color resistor W. The 4 colors are sequentially and alternatively arranged in circulation. In addition, in the present embodiment, for two adjacent rows of sub-pixels, the corresponding color resistors are arranged by staggering for two sub-pixels, so as to improve uniformity of mixed colors in the second direction Dy. In some other embodiments of the present disclosure, N can also be other natural numbers which are greater than or equal to 2, so that a multi-color display can be achieved.

Referring to FIGS. 2-6, each common electrode 142 overlaps with k*Z sub-pixels SP in the first direction Dx, k is a positive integer, and Z is the least common multiple of M' and N. In the present embodiment, M'=3, N=4, and Z=12, that is, in the present embodiment, each common electrode 142 overlaps with k*12 sub-pixels in the first direction Dx. It should be noted that, the expression "overlap" herein means that, an orthogonal projection of the common electrode 142 on the first glass substrate 102 at least partially overlaps with an orthogonal projection of the sub-pixel SP on the first glass substrate 102. In the present embodiment, k is not limited, which can be any value greater than or equal to 1.

Optionally, in the present embodiment, 8≤k≤27, that is, in the first direction Dx, each common electrode overlaps with 96-324 sub-pixels SP, that is, each common electrode overlaps with 32-108 pixel groups P. Since the width-length ratio of the sub-pixel SP is substantially 3:1, three adjacent sub-pixels SP along the first direction Dx constitute one pixel group P. Therefore, in the second direction Dy, each common electrode overlaps with 96-324 sub-pixels SP, that is, each common electrode overlaps with 32-108 pixel groups. This is because, a contact area between a finger of a user and the touch display panel is generally within a range of 4 mm*4 m-5 mm*5 mm, when the common electrode is smaller than 4 mm*4 mm, a single touch will cause capacitance change of multiple adjacent common electrodes 142, and the actual size of multiple common electrodes may be larger than the contact area between the finger and the touch display panel, resulting in an incorrect touch position; when the common electrode is larger than 5 mm*5 mm, the touch position cannot be precisely distinguished due to insufficient accuracy. Taking a common display device as an example, the pixel per inch (Pixel Per Inch, PPI) is in a range of 200-550, the sub-pixel according to the present embodiment has a ratio of the long edge to the short edge being 3:1, and 3 sub-pixels constitute a pixel group, when the ppi is in a range of 200-550, the width of the sub-pixel is in a range of 15.4 μm-42.3 μm. As a result, when setting both the length and width of the common electrode to be in a range of 4 mm-5 mm, the number of sub-pixel theoretically overlapped in the first direction Dx is in a range of 95-325, and 8≤k≤27, the actual number of overlapped sub-pixel is in a range of 96-324. Similarly, it can be calculated that, when the area of the common electrode is in a range of 4 mm*4 mm-5 mm*5 mm, and the ppi is in a range of 200-550, the number of the sub-pixel theoretically overlapped in the second direction Dy is in a range of 32-108. Since the colors of two adjacent rows of pixels are arranged alternatively, in order to guarantee that the electric potential is zero when displaying a frame, the number of sub-pixel actually overlapped in the second direction Dy is any even number in a range of 32-108. For example, in the present embodiment, in the first direction Dx, each common electrode 142 can be overlapped with 180 sub-pixels SP, that is, overlapped with 60 pixel groups P, at this time, k=15 (180/12=15).

The technical effect will be illustrated with reference to the display frame through touch detection. Referring to FIGS. 8a-8d, FIG. 8a illustrates a schematic diagram of a first drive frame of area A in FIG. 4; FIG. 8b illustrates a schematic diagram of a second drive frame of area A in FIG. 4; FIG. 8c illustrates a schematic diagram of a third drive frame of area A in FIG. 4; FIG. 8d illustrates a schematic diagram of a fourth drive frame of area A in FIG. 4.

In order to save debug time, when the frame detection and the touch detection needs to be performed to the display panel at the same time, a special display touch detection frame needs to be input to the touch display panel. The display touch detection frame is usually presented as: the common electrodes are illuminated in a column interval, and the pixel groups are illuminated in a dot interval. It should be noted that, the expression "illuminate" herein refers to applying a voltage thereon. That is, in a plurality of common electrodes arranged in a matrix, a common voltage is applied in an interval, for example, in a display frame, applying a common voltage to the common electrodes in columns of an odd number, but not applying a common voltage to the common electrodes in columns of an even number, or in a display image, not applying a common voltage to the common electrodes in columns of an odd number, but applying a common voltage to the common electrodes in columns of an even number. Moreover, the pixel groups are illuminated in a dot interval, that is, for pixel groups located in any row or any column, the pixel electrodes of the pixel groups are applied with a drive voltage in interval, for example, in a display frame, the pixel electrodes of the sub-pixels of an odd pixel group of the pixel groups in an odd column is applied with a drive voltage, and the pixel electrodes of the sub-pixels of an even pixel group of the pixel groups in an even column is applied with a drive voltage, other pixel groups are not applied with a drive voltage, or, in a display frame, the pixel electrodes of the sub-pixels of an even pixel group of the pixel groups in an odd column is applied with a drive voltage, and the pixel electrodes of the sub-pixels of an odd pixel group of the pixel groups in an even column is applied with a drive voltage, other pixel groups are not applied with a drive voltage.

Figure 8A:
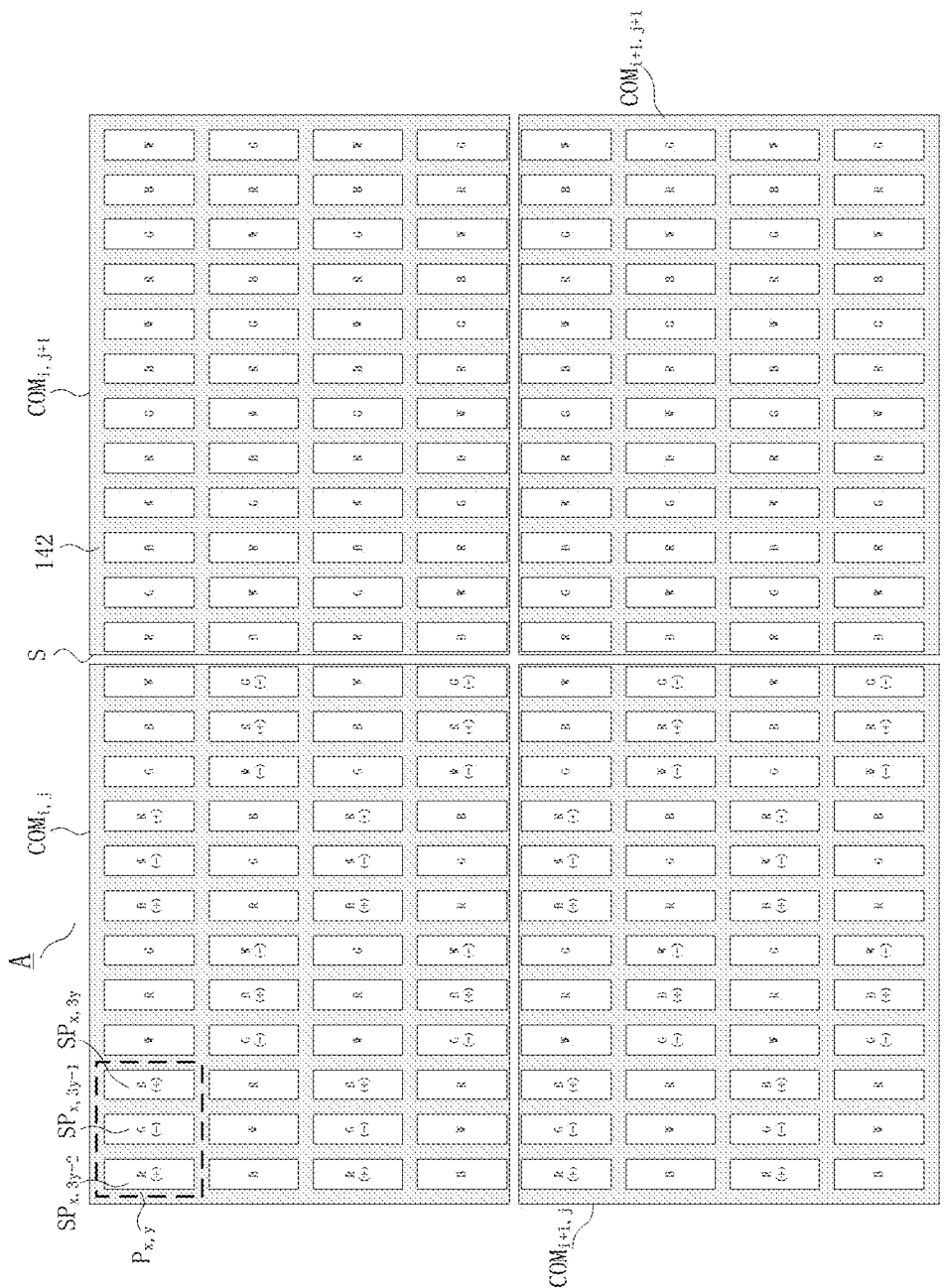
FIG. 8*a* illustrates a schematic diagram of a first drive frame of area A in FIG. 4.
Figure 8B:
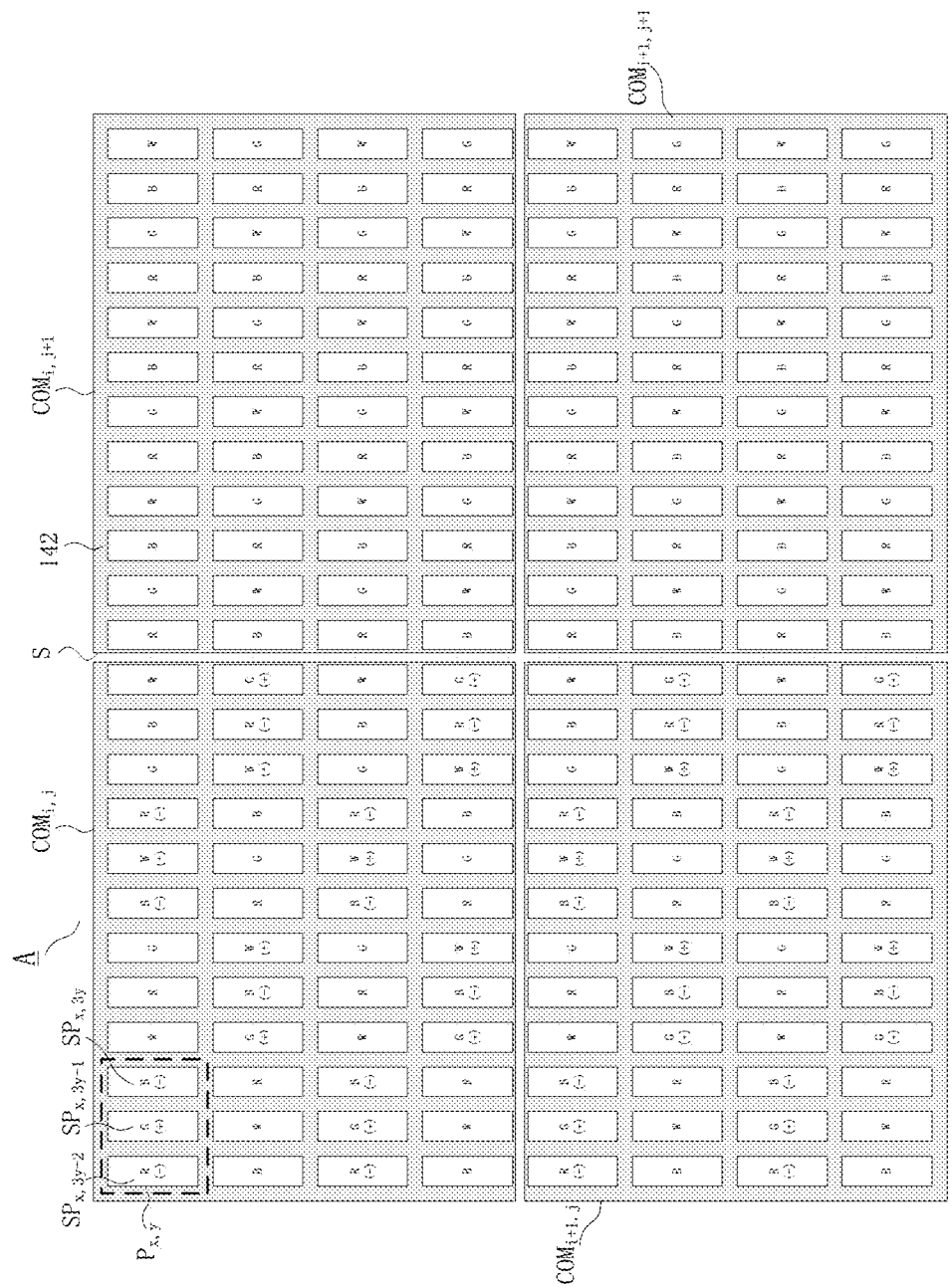
FIG. 8*b* illustrates a schematic diagram of a second drive frame of area A in FIG. 4.
Figure 8C:
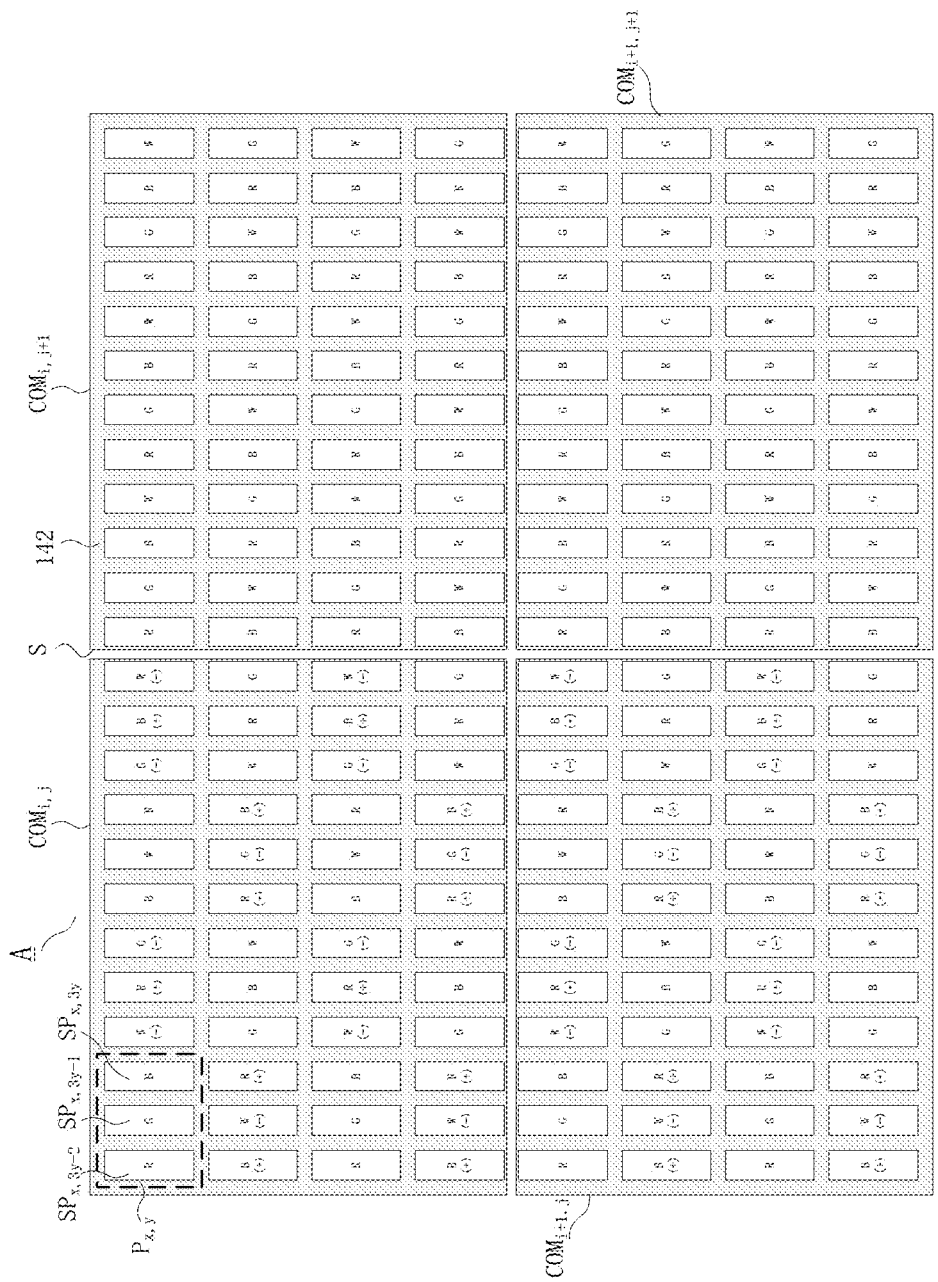
FIG. 8*c* illustrates a schematic diagram of a third drive frame of area A in FIG. 4.
Figure 8D:
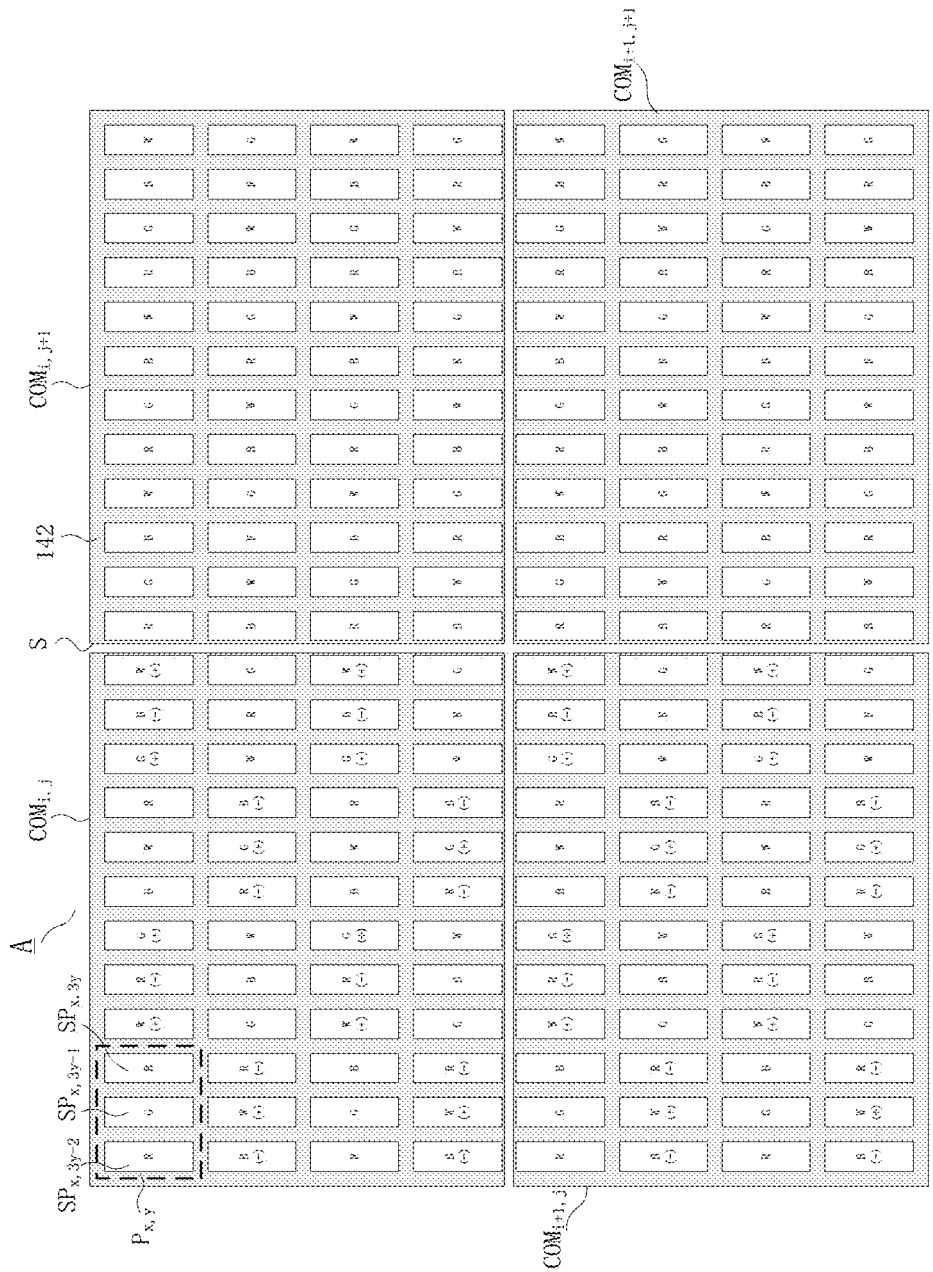
FIG. 8*d* illustrates a schematic diagram of a fourth drive frame of area A in FIG. 4.
Figure 9:
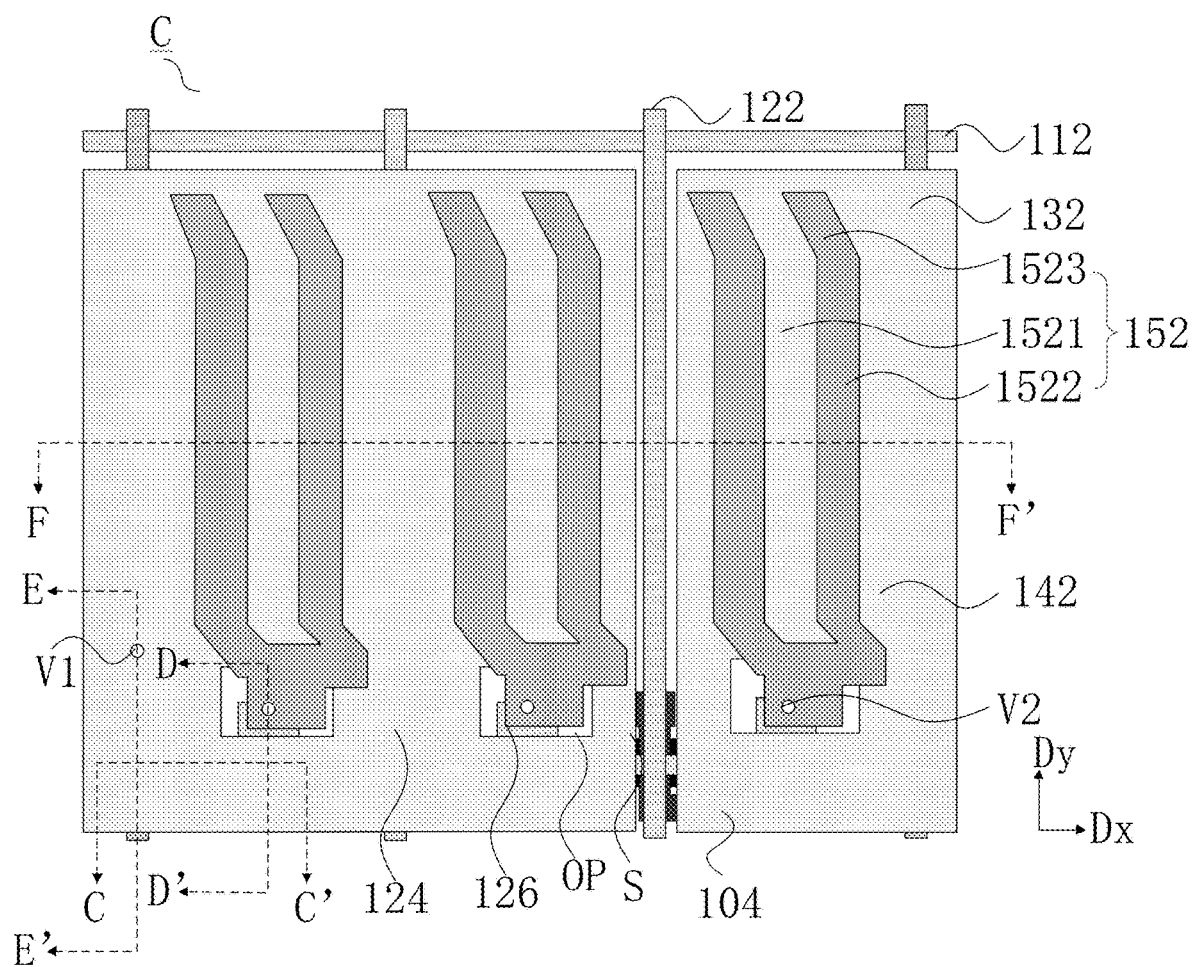
FIG. 9 illustrates another enlarged structural schematic diagram of area C in FIG. 5.

Referring to FIG. 8a, the common electrodes in column j are applied with a common voltage, the common electrode $COM_{i,j}$ in row i and column j and the common electrode $COM_{i+1,j}$ in row i+1 and column j are applied with a common voltage, when pixel electrodes corresponding to the two common electrodes are applied with the drive voltage, the corresponding sub-pixels can display. Wherein, i is a natural number smaller than I, j is a natural number smaller than J. However, the common electrode in column j+1 is not applied with a common voltage, then the pixel electrode of the sub-pixel corresponding to the common electrode in column j+1 will not display no matter whether it is applied with the drive voltage or not. Combining with the illumination of the pixel groups in dot interval, as shown in FIG. 8a, the pixel electrodes of three sub-pixels $SP_{x,3y-2}$, $SP_{x,3y-1}$ and $SP_{x,3y}$ of the pixel group $P_{x,y}$ in row x and column y are applied with a drive voltage, the three sub-pixels corresponding to the pixel group can display a frame. Correspondingly, in the drive frame shown in FIG. 8a, in all the pixel groups corresponding to the common electrodes in column j, all the sub-pixels corresponding to the pixel groups in odd rows and odd columns, and the pixel electrodes of all the sub-pixels corresponding to the pixel groups in even rows and even columns are applied with a drive voltage, so as to display a frame.

In order to prevent from polarization of the liquid crystal in the liquid crystal layer, generally, when displaying, the polarity of the drive voltage applied on the pixel electrode of each sub-pixel needs to be reversed, that is, when the first frame is applied with a positive voltage, the next frame needs to be applied with a negative voltage. FIG. 8a and FIG. 8b are two drive frames which are driven alternatively.

Further, in order to prevent voltage drift of the common electrode, which may cause fluctuation of the brightness of the frame, it is necessary to apply an opposite drive voltage with opposite polarities to the two adjacent columns of pixel electrodes, so as to balance the brightness difference between the former and latter frames caused by overlarge difference of the pixel voltage and common voltage of. Therefore, in FIG. 8a and FIG. 8b, the voltages applied on the pixel electrodes corresponding to the two adjacent columns of the sub-pixels have opposite polarities.

In the present embodiment, since each common electrode covers 12 k sub-pixels in the first direction Dx, it can be guaranteed that the display area corresponding to each common electrode displays a uniform gray color while the common electrodes are illuminated in column interval and the pixel groups are illuminated in dot interval, and the area corresponding to each common electrode can reach a zero electric potential.

This is because, in the present embodiment, each pixel group includes three sub-pixels arranged along the first direction Dx, and in the first direction Dx, the sub-pixels of four colors are arranged alternatively, under the situation of a frame that the common electrodes are illuminated in column interval and the pixel groups are illuminated in dot interval. When each common electrode covers 12 k sub-pixels in the first direction Dx, and covers an even column of sub-pixels in the column direction, it can be guaranteed that, in all the sub-pixels corresponding to each common electrode, the illuminated four colors of sub-pixels have the same number, and the polarities of all the illuminated sub-pixels are counteracted to be zero. As shown in FIG. 8a or FIG. 8b, in FIG. 8a, in the sub-pixels corresponding to the common electrodes in row i and column j, there are 6 red sub-pixels, 6 green sub-pixels, 6 blue sub-pixels and 6 white sub-pixels, and in the 24 illuminated sub-pixels, there are 12 sub-pixels with positive polarity and 12 sub-pixels with negative polarity. Therefore, the final numbers of sub-pixels of the four colors are the same, and the final frame presents a gray color. In the gray color, flicker of the frame can be visually distinguished. Since the sub-pixels corresponding to each common electrode are electrically neutral, no parasitic capacitance exists between adjacent common electrodes. As a result, a poor display due to generation of fringe electric field can be avoided. Since the common electrodes are illuminated in a column interval, when a column of common electrodes is illuminated, touch detection can be performed to the column of common electrodes, by detecting the touch sensitivity of common electrodes in a corresponding column, whether the touch electrodes in the corresponding column have the problems of short circuit, open circuit, decreased touch sensitivity and the like can be detected. Therefore, in a frame, the touch detection and the display detection can be achieved at the same time.

At this time, when each common electrode does not cover 12 k sub-pixels in the first direction, the display touch detection cannot be performed. As an example, when the pixel arrangement according to the present embodiment is adopted, that is, each pixel group includes three sub-pixels in the first direction Dx, and in the first direction Dx, sub-pixels of four different colors are alternatively arranged. As an example, when each common electrode covers 9 k sub-pixels in the first direction, if k=1, then the numbers of sub-pixels of different colors corresponding to a common electrode are not identical, the total electric potential will not be zero, thus the final color will not be gray, therefore, the frame detection cannot be performed. Therefore, only when each common electrode covers 12 k sub-pixels in the first direction, the frame detection can be performed.

After finishing the detection to the first drive frame and the second drive frame, the detection to the third drive frame and the fourth drive frame can be performed. The difference between the detection to the third drive frame and the fourth drive frame and the detection to the first drive frame and the second drive frame only lies in that the driven columns of common electrodes are different, thus the details will not be repeated herein.

In the touch display panel according to the above embodiment, since each common electrode covers 12 k sub-pixels, a signal drive frame can be adopted to perform the touch detection and display detection at the same time, so as to save debug time.

Figure 10A:
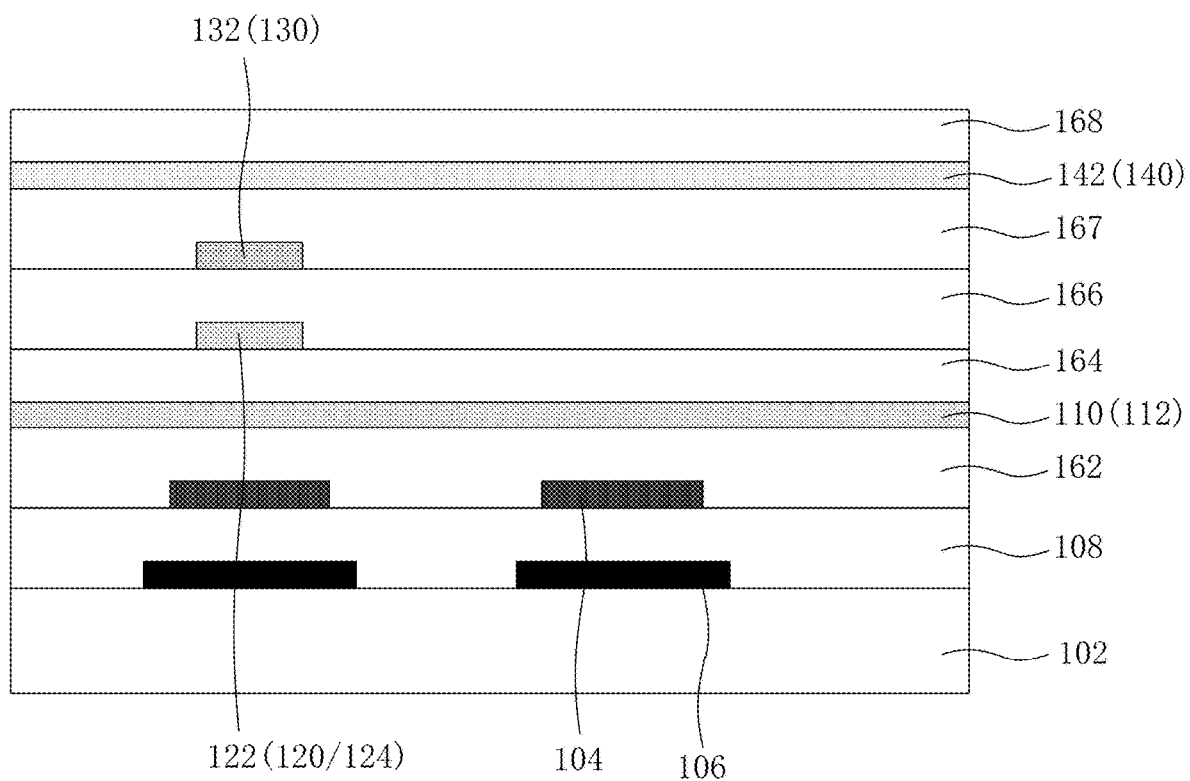
FIG. 10*a* illustrates a cross-sectional structural schematic diagram of CC' section in FIG. 9.
Figure 10B:
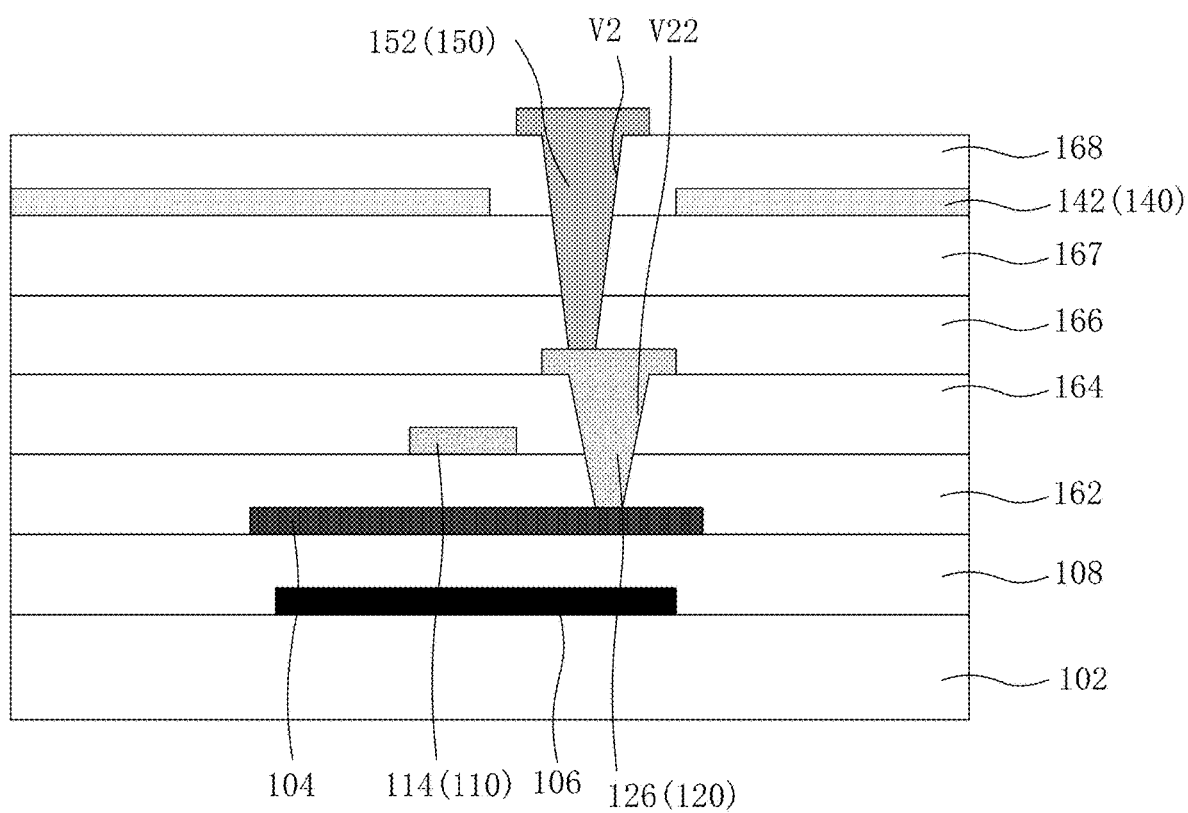
FIG. 10*b* illustrates a cross-sectional structural schematic diagram of DD' section in FIG. 9.
Figure 10C:
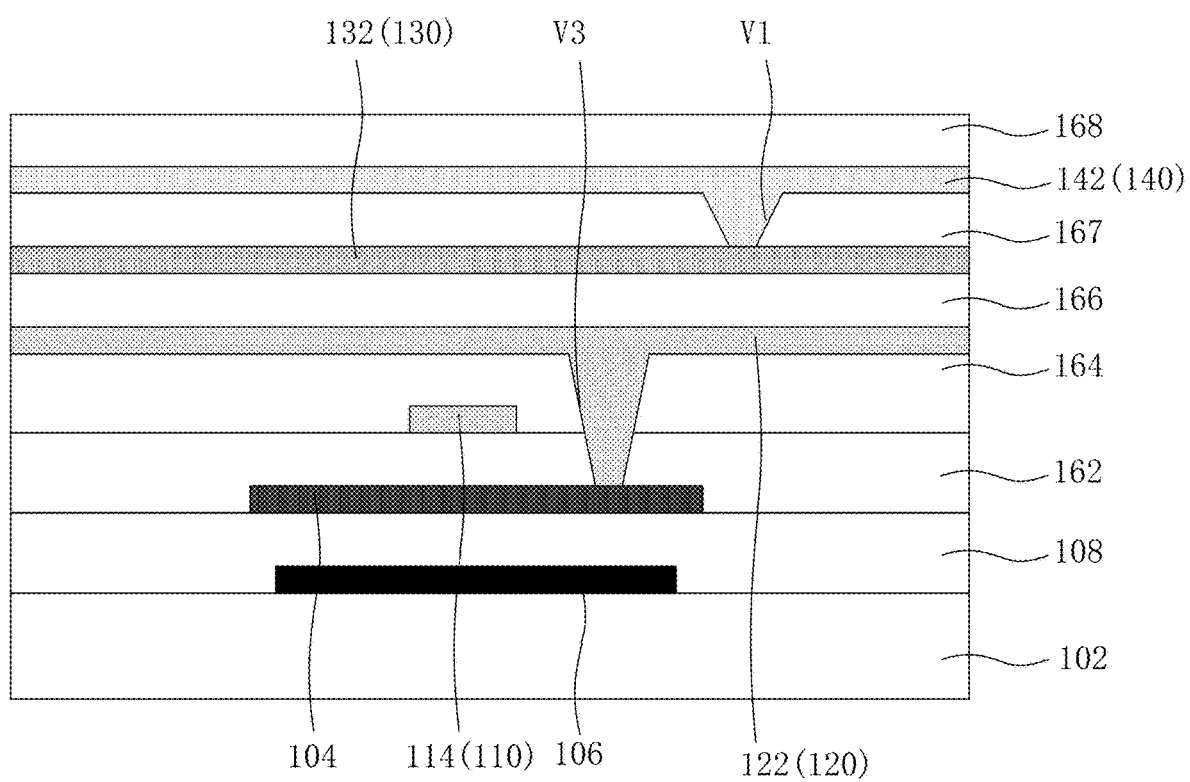
FIG. 10*c* illustrates a cross-sectional structural schematic diagram of EE' section in FIG. 9.
Figure 10D:
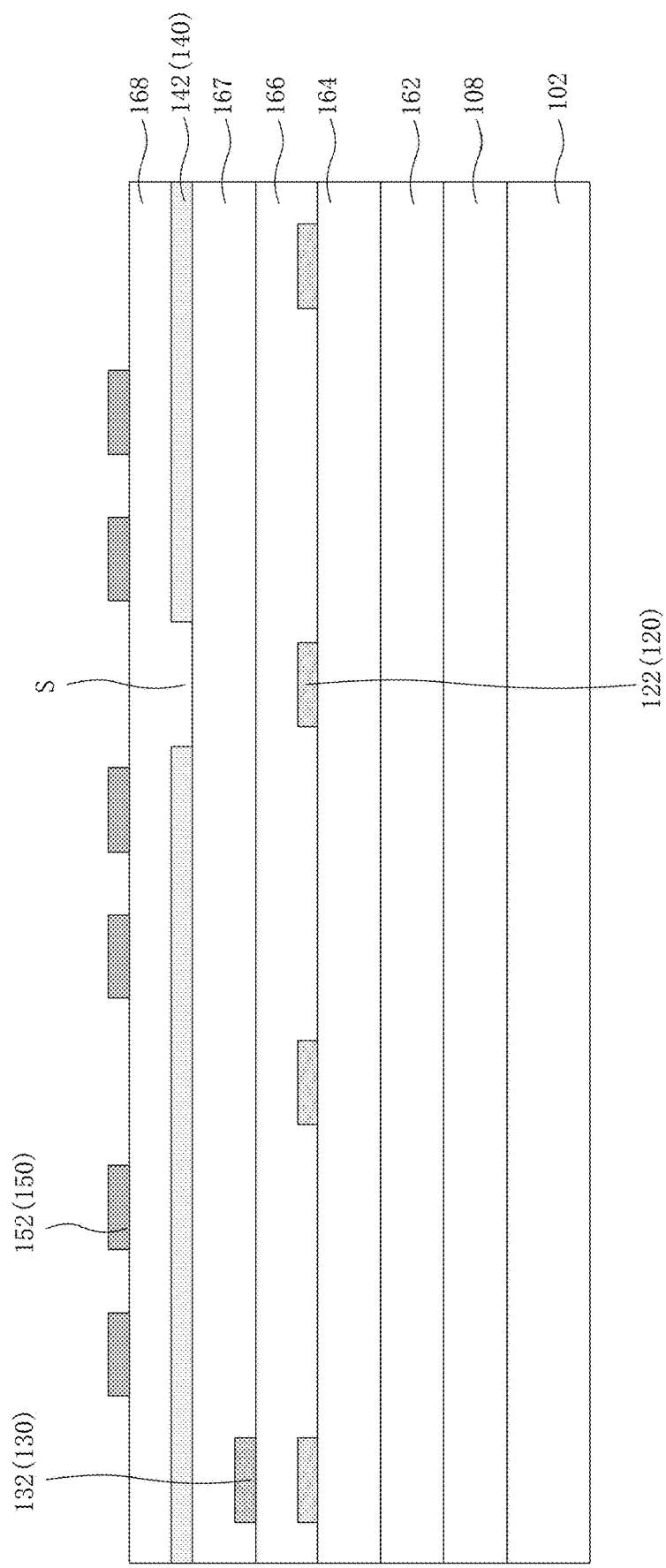
FIG. 10*d* illustrates a cross-sectional structural schematic diagram of FF' section in FIG. 9.

Please refer to FIG. 9 and FIGS. 10a-10d, FIG. 9 illustrates another enlarged structural schematic diagram of area C in FIG. 5; FIG. 10a illustrates a cross-sectional structural schematic diagram of CC' section in FIG. 9; FIG. 10b illustrates a cross-sectional structural schematic diagram of DD' section in FIG. 9; FIG. 10c illustrates a cross-sectional structural schematic diagram of EE' section in FIG. 9; FIG. 10d illustrates a cross-sectional structural schematic diagram of FF' section in FIG. 9.

The embodiments shown in FIG. 9 and FIGS. 10a-10d and the embodiments shown in FIG. 6, FIG. 7a and FIG. 7b have the same arrangement of the sub-pixels, that is, correspondence between the common electrodes and the sub-pixels, which will not be repeated herein. The difference therebetween lies in the structure of the sub-pixel and the structure of the film layer, which will be illustrated as follows.

Referring to FIGS. 2-5, FIG. 9 and FIGS. 10a-10d, the touch display panel provided by the an embodiment includes an array substrate 100 and a color film substrate 200, the array substrate 100 and the color film substrate 200 are fitted by a sealing adhesive 400. The sealing adhesive 400 is placed at a periphery of the color film substrate 200. A side of the array substrate 100 including the first glass substrate 102 is slightly larger than the second glass substrate 202 of the color film substrate 200, so as to form a step portion, and a drive circuit or a drive chip can be arranged on the step portion. The array substrate 100, the color film substrate 200 and the sealing adhesive 400 cooperatively define a sealed space, and a liquid crystal layer 300 is placed in the sealed space. Further, the touch display panel of the present embodiment includes a display area DA and a non-display area NDA, the non-display area NDA surrounds the display area DA, the sealing adhesive 400 is placed at the non-display area of the touch display panel. The non-display area NDA further includes a step area, a touch drive circuit DC is arranged on the step area. The array substrate 100 includes a first glass substrate 102, a plurality of scan lines 112 and a plurality of data lines 122. The scan lines 112 extend along a first direction Dx, the data lines 122 extend along a second direction Dy. In the present embodiment, a first metal layer and a second metal layer are arranged on a surface of a side of the first glass substrate 102 facing the color film substrate 200, the scan lines 112 are arranged at the first metal layer, and the data lines 122 are arranged at the second metal layer. The two adjacent scan lines 112 and the two adjacent data lines 122 intersect with each other to define a sub-pixel SP.

The array substrate 100 includes a first glass substrate 102, a plurality of scan lines 112 and a plurality of data lines 122. The scan lines 112 extend along a first direction Dx, the data lines 122 extend along a second direction Dy. In the present embodiment, a first metal layer and a second metal layer are arranged on a surface of the first glass substrate 102 facing the color film substrate 200, the scan lines 112 are arranged at the first metal layer, and the data lines 122 are arranged at the second metal layer. The two adjacent scan lines 112 and the two adjacent data lines 122 intersect with each other to define a sub-pixel SP.

A thin film transistor T and a pixel electrode 152 are further placed in each sub-pixel SP area. The thin film transistor T includes a gate electrode 114, a semi-conductor 104, a source electrode 124 and a drain electrode 126. The gate electrode 114 of the thin film transistor T is connected to a corresponding scan line 112, the source electrode 124 of the thin film transistor T is connected to a corresponding data line 122, and the drain electrode 126 of the thin film transistor is connected to the pixel electrode 152 located in the sub-pixel SP area. After the scan line 112 is applied with a start voltage, the semi-conductor 104 located on the gate electrode 114 is turned on, at this time, signal transmission function is enabled, then the signal is transmitted from the data line 112 to the pixel electrode 152 electrically connected to the drain electrode 126.

In the present embodiment, the touch display panel includes a first metal layer 110 arranged on the first glass substrate 102, and the first metal layer 110 includes a scan line 112. The first metal layer 110 further includes a gate electrode 114. In some other embodiments of the present disclosure, the first metal layer 110 can also include a common electrode line, a signal wiring located in the non-display area and the like. If the first metal layer 110 includes a common electrode line, then the common electrode line is electrically connected to the common electrode 142 by passing through a through hole defined through the insulation layer between the first metal layer and a layer where the common electrode is located, so as to reduce the resistance of the common electrode.

A semi-conductor layer 104 is placed between the first glass substrate 102 and the first metal layer 110. The conductor layer 104 is formed at the position corresponding to the gate electrode 114 of each thin film transistor T, in the present embodiment, the semi-conductor layer 104 can be a low temperature poly-silicon.

A gate electrode insulation layer 162 is placed between the semi-conductor layer 104 and the first metal layer 110, so as to guarantee the insulation between the semi-conductor layer 104 and the first metal layer 110.

Further, a light shield layer 106 is placed between the semi-conductor layer 104 and the first glass substrate 102 so as to prevent influence of the back light on the performance of the semi-conductor layer 104, the light shield layer 106 can be made of a metal or other light-shield material, so as to block the light coming from the back light. A buffer layer 108 is placed between the light shield layer 106 and the semi-conductor layer 104.

The second metal layer 120 is arranged on the first metal layer 110, the second metal layer 120 includes the data line 122. Further, the second metal layer 120 further includes the source electrode 124 and the drain electrode 126 of the thin film transistor T. In some other embodiments of the present disclosure, the second metal layer 120 can also include the signal wiring located in the non-display area. The patterning process of the second metal layer 120 is the same with the related art, which will not be repeated herein. An interlayer insulation layer 164 is placed between the first metal layer 110 and the second metal layer 120.

A second sub-through hole V22 is defined in the interlayer insulation layer 164 and the gate electrode insulation layer 162, so as to expose the drain electrode contact area of the semi-conductor layer 104. The drain electrode 126 is connected to the drain electrode contact area of the semi-conductor layer 104 through the second sub-through hole V22.

A first passivation layer 166 is placed on the second metal layer 120. A third metal layer 130 is arranged on the first passivation layer 166, and the third metal layer 130 includes a touch electrode wiring 132. A second passivation layer 167 is placed on the third metal layer 130.

The first electrode layer 140 is arranged on the second passivation layer 167, and the first electrode layer 140 includes a common electrode 142.

An interelectrode insulation layer 168 is arranged on the first electrode layer 140. The second through hole V2 is defined penetrating through the first passivation layer 166, the second passivation layer 167 and the interelectrode insulation layer 168, so as to expose the drain electrode 126.

A second electrode layer 150 is arranged on the interelectrode insulation layer 168, and the second electrode layer 150 includes a pixel electrode 152.

The pixel electrode is connected to the drain electrode 126 through the second through hole V2.

The first electrode layer 140 and the second electrode layer 150 are respectively transparent conductive layers, and two electrode layers are insulated from each other by the interelectrode insulation layer 168. The structure of the present embodiment is a top pixel electrode structure, that is, the common electrode 142 is located at a side of the pixel electrode 152 close to the first glass substrate 102. The pixel electrode 152 is formed in a range of each sub-pixel P, and the pixel electrode is electrically connected to the drain electrode 126 of the thin film transistor T through a second through hole V2, and the pixel electrode receives pixel electrode signals from the data line 122 by thin film transistor T. Each common electrode 142 is electrically connected to a touch electrode wiring 132. The third metal layer 130 where the touch electrode wiring 132 is located and the first electrode layer 140 where the common electrode 142 is located are respectively arranged at two sides of the second passivation layer 167, the common electrode 142 is electrically connected to the corresponding touch electrode wiring 132 through the first through hole V1 penetrating through the second passivation layer 167. Since each common electrode 142 is respectively connected to a touch electrode wiring 132, thus, in the touch process, the touch drive circuit DC applies a touch signal to each common electrode by each touch electrode wiring 132, by detecting the magnitude and change of the self-capacitance of each common electrode 142, the touch position can be detected, so as to achieve touch detection. In the display process, the drive circuit DC applies a common electrode signal to each common electrode through the touch electrode wiring 132 at the same time, so as to form an electric field between the common electrode 142 the pixel electrode 152 for driving the liquid crystal molecules in the liquid crystal layer 300 to rotate, thereby achieving display function.

In the present embodiment, each touch electrode wiring 132 is located above the data line 122, and a projection of the touch electrode wiring 132 on the first glass substrate 102 overlaps with a projection of the data line 122 on the first glass substrate 102. Under such a structure, it is unnecessary to provide extra wiring space of the touch electrode wiring, which avoids influence on an aperture ratio of the sub-pixel. In the range of each sub-pixel P, the pixel electrode 152 includes a plurality of strip pixel electrodes 1522 and a plurality of strip pixel electrode slits 1521. An fringe electric field can be formed between the strip pixel electrode 1522 and the common electrode 142, so as to drive the liquid crystal molecules to rotate. A storage capacitance can be formed at a direct facing area between the strip pixel electrode 1522 and the common electrode 142, so as to improve the stability of the liquid crystal capacitance. Further, in order to reduce trace mura, corners can be placed on opposite ends of the strip pixel electrode 1522, so as to strengthen the electric field at the end area of the strip pixel electrode 1522, thereby improving the driving performance of the electric field in the area.

Figure 10E:
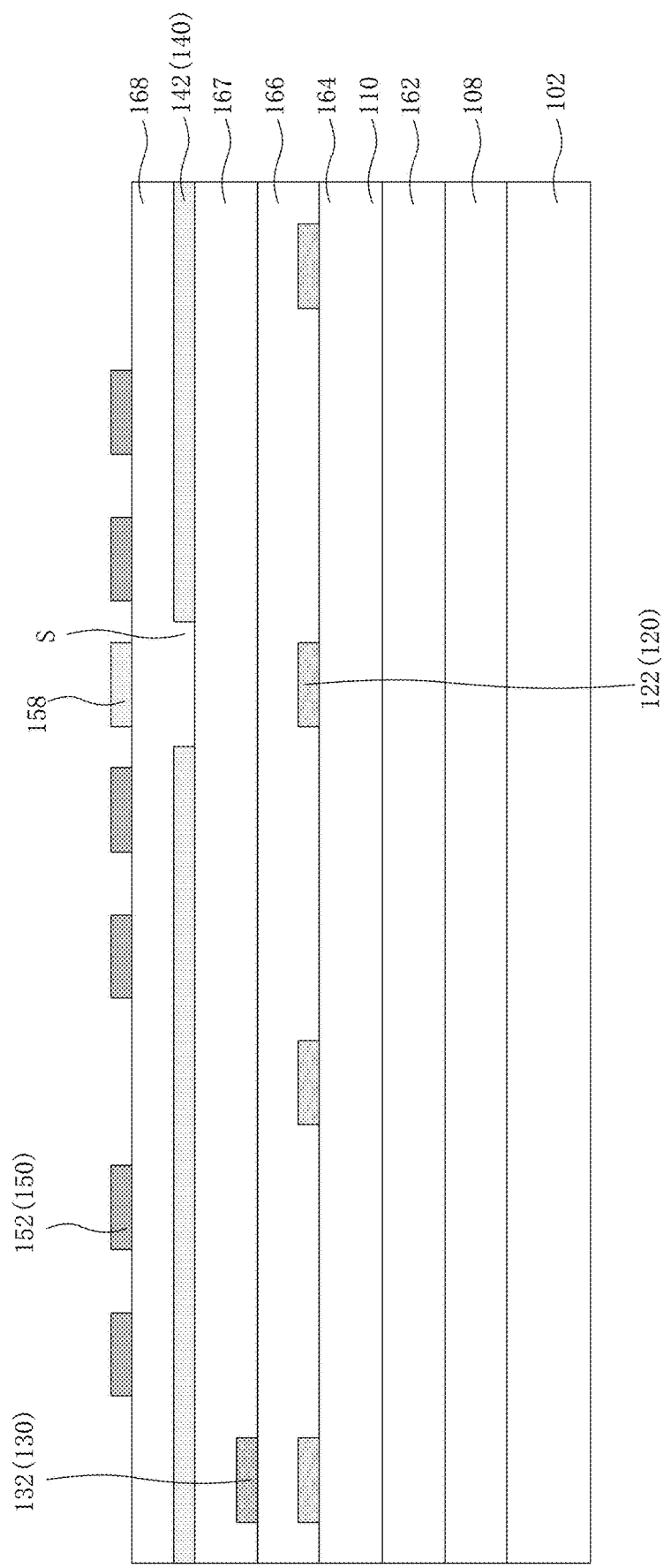
FIG. 10e illustrates another cross-sectional structural schematic diagram of FF' section in FIG. 9.

The slit S between adjacent common electrodes 142 is located above a data line 122, the area can be sheltered by a black matrix on the color film substrate 200, which can avoid the slit between the common electrodes from being formed between the opening areas of the pixel, so as not to influence display. Since no slit is defined in the common electrode above the data line 122, the common electrode above the data line 122 can shelter the parasitic capacitance on the data line 122. Due to the existence of the slit S between the adjacent common electrodes, it is possible that the parasitic capacitance on the data line 122 interferes the liquid crystal molecules in the liquid crystal layer 300, therefore, an auxiliary electrode can be arranged at the position corresponding to the slit S between the common electrodes. Referring to FIG. 10e, FIG. 10e illustrates another cross-sectional structural schematic diagram of FF' section in FIG. 9. In FIG. 10e, an auxiliary electrode 158 is placed, and the auxiliary electrode 158 can be electrically connected to a bus of the common electrode, so as to receive the common electrode signal. The auxiliary electrode 158 can shelter the parasitic capacitance of the data line 122, and thus can strengthen the electric field at the slit S. The auxiliary electrode 158 can be located at the second electrode layer 150, which will not bring additional processes.

Figure 11:
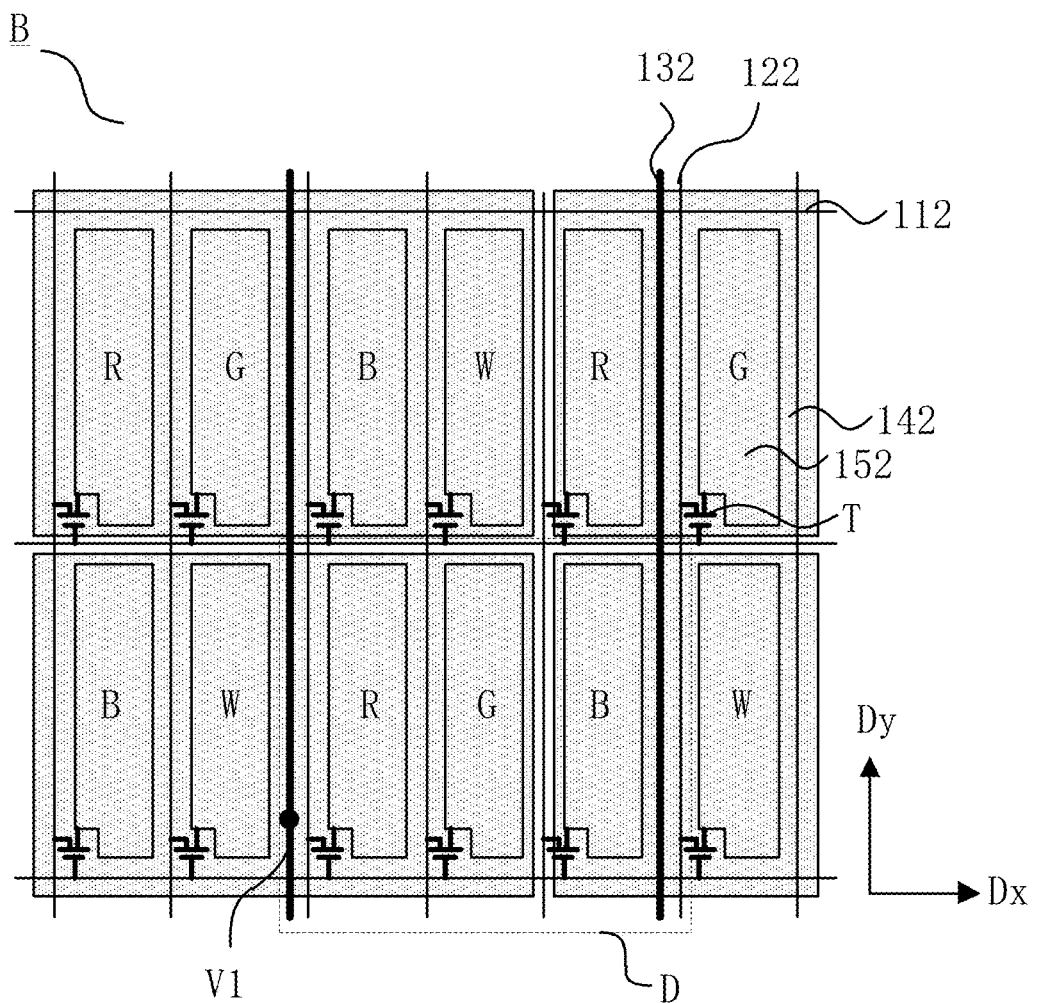
FIG. 11 illustrates another enlarged structural schematic diagram of area B in FIG. 4.
Figure 12:
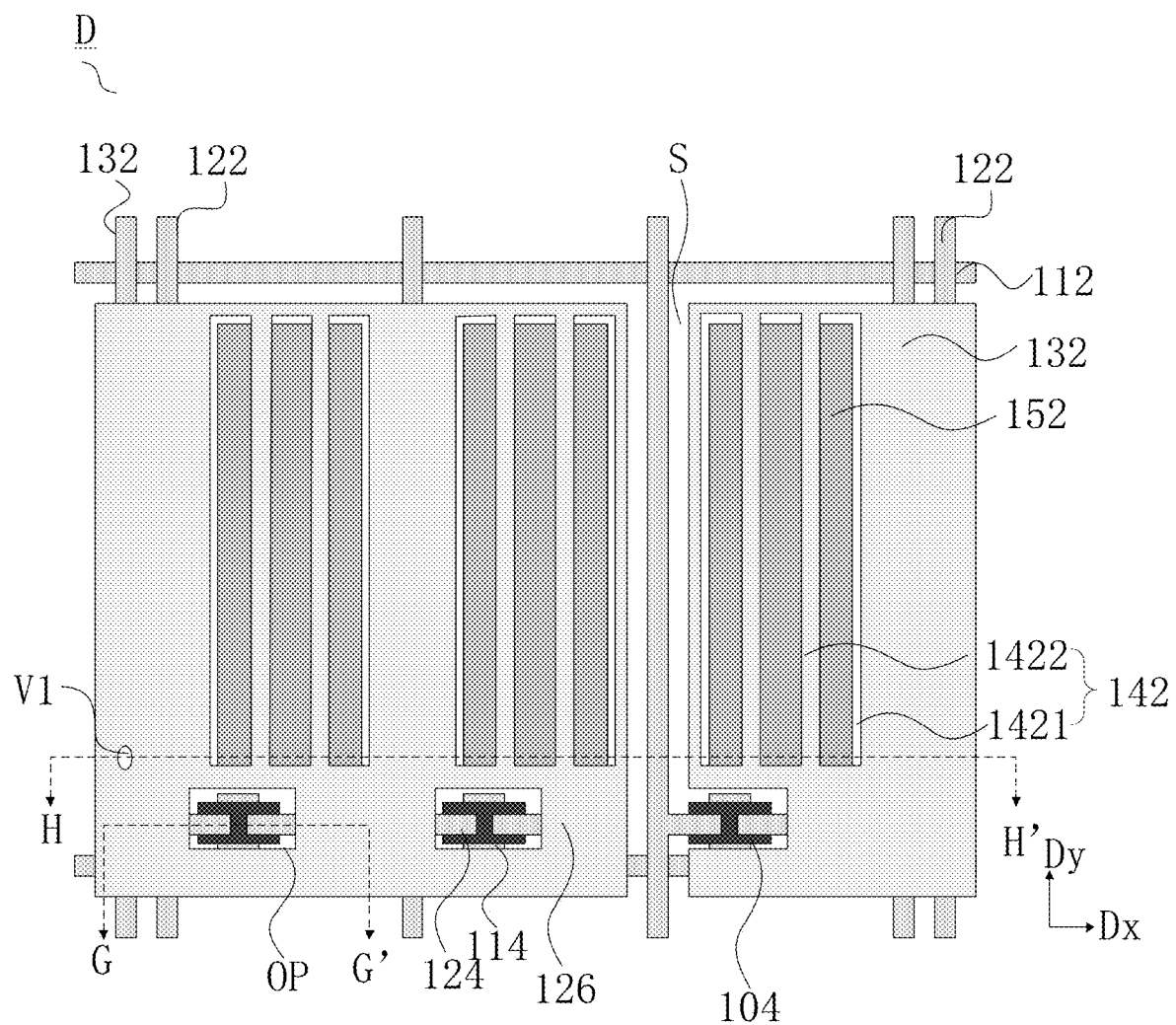
FIG. 12 illustrates an enlarged structural schematic diagram of area D in FIG. 11.
Figure 13A:
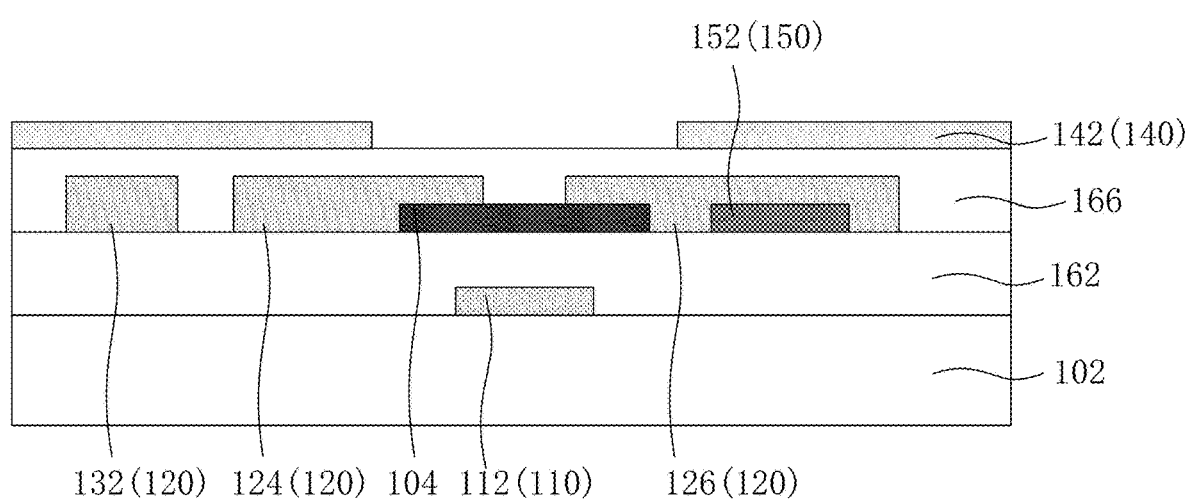
FIG. 13a illustrates a cross-sectional structural schematic diagram of GG' section in FIG. 11.
Figure 13B:
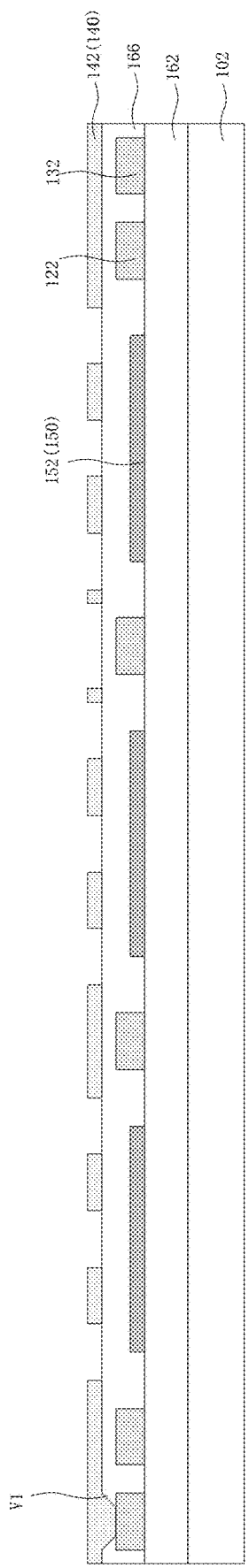
FIG. 13b illustrates a cross-sectional structural schematic diagram of HH' section in FIG. 11.

Please refer to FIG. 11, FIG. 12, FIG. 13a and FIG. 13b, FIG. 11 illustrates another enlarged structural schematic diagram of area B in FIG. 4; FIG. 12 illustrates an enlarged structural schematic diagram of area D in FIG. 11; FIG. 13a illustrates a cross-sectional structural schematic diagram of GG' section in FIG. 11; FIG. 13b illustrates a cross-sectional structural schematic diagram of HH' section in FIG. 11.

The embodiments shown in FIG. 11, FIG. 12, FIG. 13a and FIG. 13b and the embodiments shown in FIG. 6, FIG. 7a and FIG. 7b have the same arrangement of the sub-pixels, that is, correspondence between the common electrodes and the sub-pixels, which will not be repeated herein. The difference therebetween lies in the structure of the sub-pixel and the structure of the film layer, which will be illustrated as follows.

Referring to FIGS. 2-4, FIG. 11, FIG. 12, FIG. 13a and FIG. 13b, the touch display panel provided by the embodiment includes an array substrate 100 and a color film substrate 200, the array substrate 100 and the color film substrate 200 are fitted by a sealing adhesive 400. The sealing adhesive 400 is arranged at the periphery of the color film substrate 200. A side of the array substrate 100 including the first glass substrate 102 is slightly larger than the second glass substrate 202 of the color film substrate 200, so as to form a step portion, a drive circuit or a drive chip can be arranged on the step portion. The array substrate 100, the color film substrate 200 and the sealing adhesive 400 form a sealed space, a liquid crystal layer 300 is placed in the sealed space. Further, the touch display panel of the present embodiment includes a display area DA and a non-display area NDA, the non-display area NDA surrounds the display area DA, the sealing adhesive 400 is arranged at the non-display area of the touch display panel. The non-display area NDA further includes a step area, a touch drive circuit DC is arranged on the step area.

The array substrate 100 includes a first glass substrate 102, a plurality of scan lines 112 and a plurality of data lines 122. The scan lines 112 extend along a first direction Dx, the data lines 122 extend along a second direction Dy. In the present embodiment, a first metal layer and a second metal layer are arranged on a surface of a side of the first glass substrate 102 facing the color film substrate 200, the scan lines 112 are arranged at the first metal layer, and the data lines 122 are arranged at the second metal layer. The adjacent two scan lines 112 and the adjacent two data lines 122 intersect with each other to define a sub-pixel SP.

A thin film transistor T and a pixel electrode 152 are also provided in each sub-pixel SP area. The thin film transistor T includes a gate electrode 114, a semi-conductor 104, a source electrode 124 and a drain electrode 126. The gate electrode 114 of the thin film transistor T is connected to a corresponding scan line 112, the source electrode 124 of the thin film transistor T is connected to a corresponding data line 122, and the drain electrode 126 of the thin film transistor is connected to the pixel electrode 152 located in the sub-pixel SP area. After the scan line 112 is applied with a start voltage, the semi-conductor 104 located on the gate electrode 114 is turned on, at this time, signal transmission function is enabled, then the signal is transmitted from the data line 112 to the pixel electrode 152 electrically connected to the drain electrode 126.

In the present embodiment, the touch display panel includes a first metal layer 110 arranged on the first glass substrate 102, and the first metal layer 110 includes a scan line 112. The first metal layer 110 can be directly arranged at a surface of a side of the first glass substrate 102 facing the color film substrate 200. The first metal layer 110 further includes a gate electrode 114. In some other embodiments of the present disclosure, the first metal layer 110 can also include a common electrode line, a signal wiring located in the non-display area and the like. If the first metal layer 110 includes a common electrode line, then the common electrode line is electrically connected to the common electrode 142 by passing through a through hole of the insulation layer between the first metal layer and a layer where the common electrode is located, so as to reduce the resistance of the common electrode.

A gate electrode insulation layer 162 is arranged on the first metal layer 110. A semi-conductor layer 104 is arranged on the gate electrode insulation layer 162. The gate electrode insulation layer 162 is located between the first metal layer 110 where the gate electrode 114 is located and the semi-conductor 104, so as to achieve the insulation between the semi-conductor layer 104 and the first metal layer 110. The semi-conductor layer 104 is formed above each gate electrode 114 of the thin film transistor T. The semi-conductor layer 104 is the same with the related art, which will not be repeated herein.

A second electrode layer 150 is arranged on the gate electrode insulation layer 162, and the second electrode layer 150 includes a pixel electrode 152.

A second metal layer 120 is arranged on the semi-conductor layer 104 and the second electrode layer 150, and the second metal layer 120 includes the data line 122 and the touch electrode wiring 132. Further, the second metal layer 120 includes the source electrode 124 and the drain electrode 126 of the thin film transistor T. In some other embodiments of the present disclosure, the second metal layer 120 also can include the signal wiring located in the non-display area. In the present embodiment, the touch electrode wiring 132 and the data line 122 are arranged in the same layer.

A first passivation layer 166 is placed on the second metal layer 120.

A first electrode layer 140 is arranged on the first passivation layer 166, and the first electrode layer 140 includes a common electrode 142.

The first electrode layer 140 and the second electrode layer 150 are respectively transparent conductive layers, two electrode layers are insulated from each other by the first passivation layer 166. The structure of the present embodiment is a top common electrode structure, that is, the common electrode 142 is located at a side of the pixel electrode 152 away from the first glass substrate 102. The pixel electrode 152 is formed in the range of each sub-pixel P, and the pixel electrode is electrically connected to the drain electrode 126 of the thin film transistor T directly, and the pixel electrode receives pixel electrode signals from the data line 122 through thin film transistor T. Each common electrode 142 is electrically connected to a touch electrode wiring 132. The second metal layer 120 where the touch electrode wiring 132 is located and the first electrode layer 140 where the common electrode 142 is located are respectively arranged at two sides of the first passivation layer 166, the common electrode 142 is electrically connected to the corresponding touch electrode wiring 132 through the first through hole V1 penetrating through the first passivation layer 166. Since each common electrode 142 is respectively connected to a touch electrode wiring 132, thus, in the touch process, the touch drive circuit DC applies a touch signal to each common electrode through each touch electrode wiring 132, through detecting the magnitude and change of the self-capacitance of each common electrode 142, the touch position can be detected, so as to achieve touch detection. In the display process, the drive circuit DC applies a common electrode signal to each common electrode through the touch electrode wiring 132 at the same time, so as to form an electric field between the common electrode 142 and the pixel electrode 152 for driving the liquid crystal molecules in the liquid crystal layer 300 to rotate, thereby achieving display function.

Figure 17:
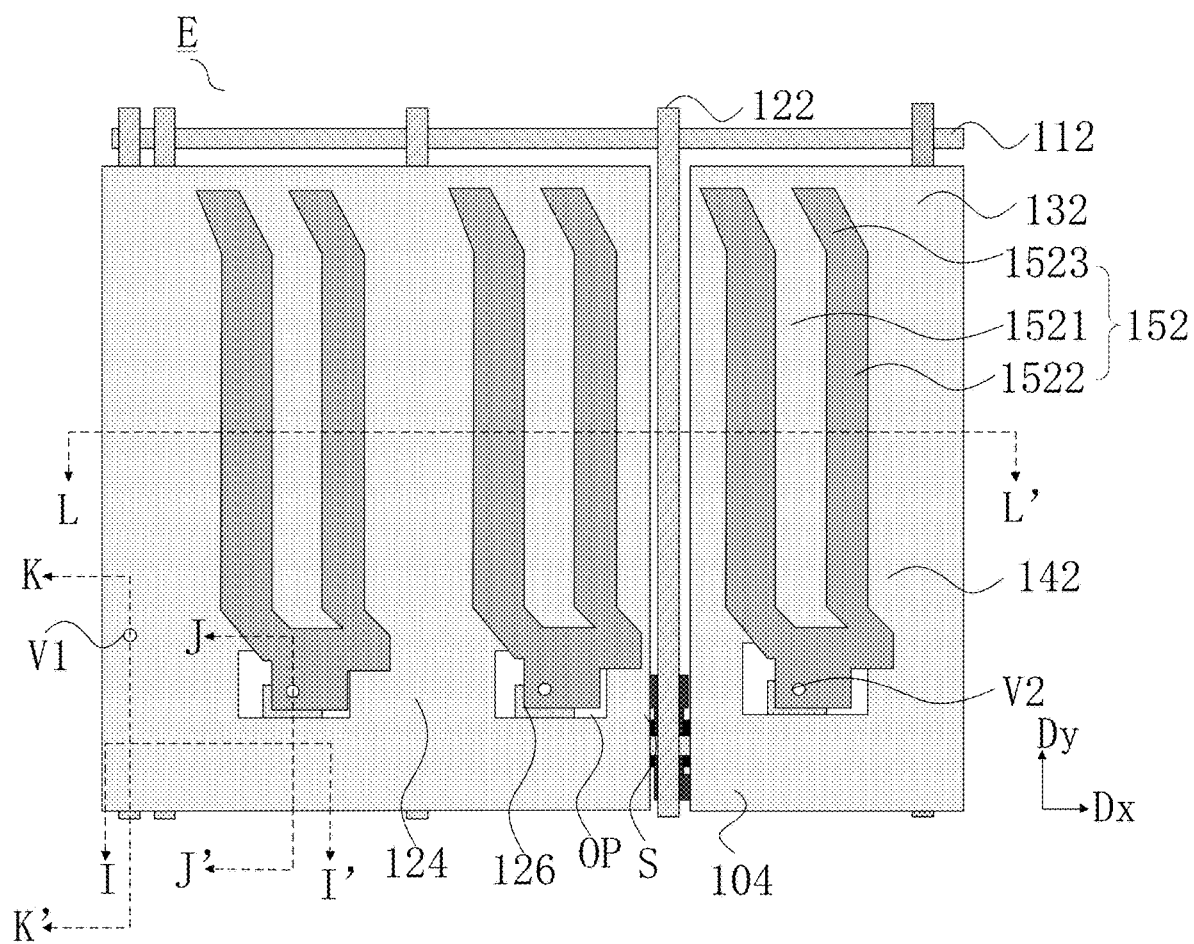
FIG. 17 illustrates another enlarged structural schematic diagram of area D in FIG. 11.
Figure 18A:
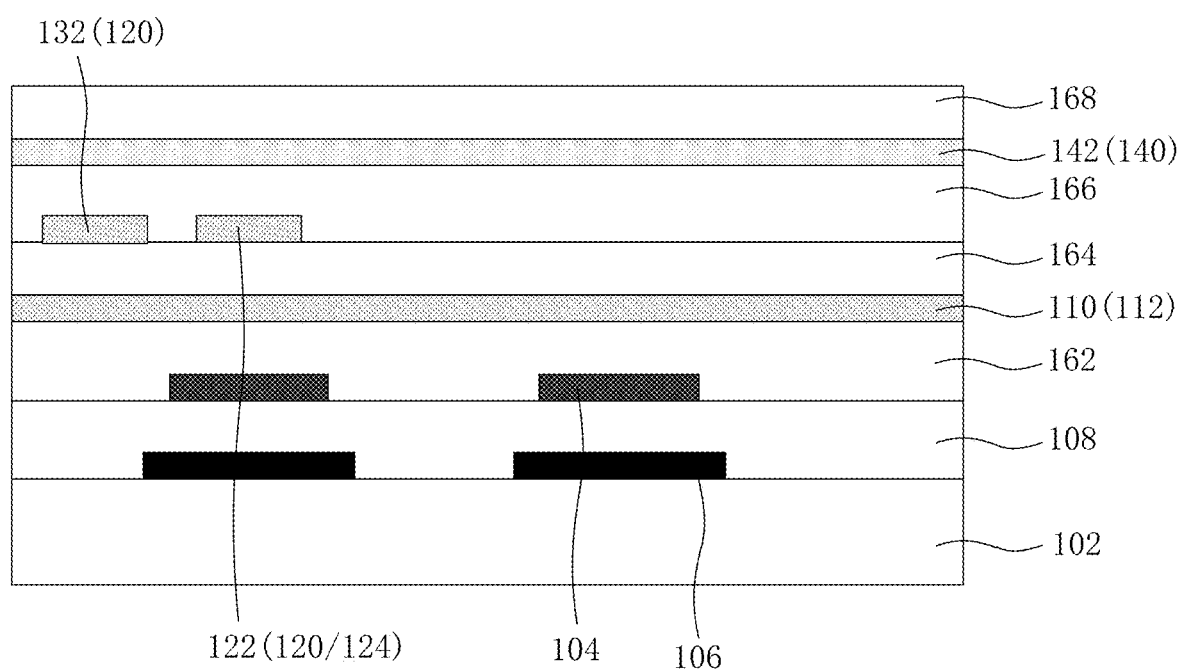
FIG. 18a illustrates a cross-sectional structural schematic diagram of II' section in FIG. 17.
Figure 18B:
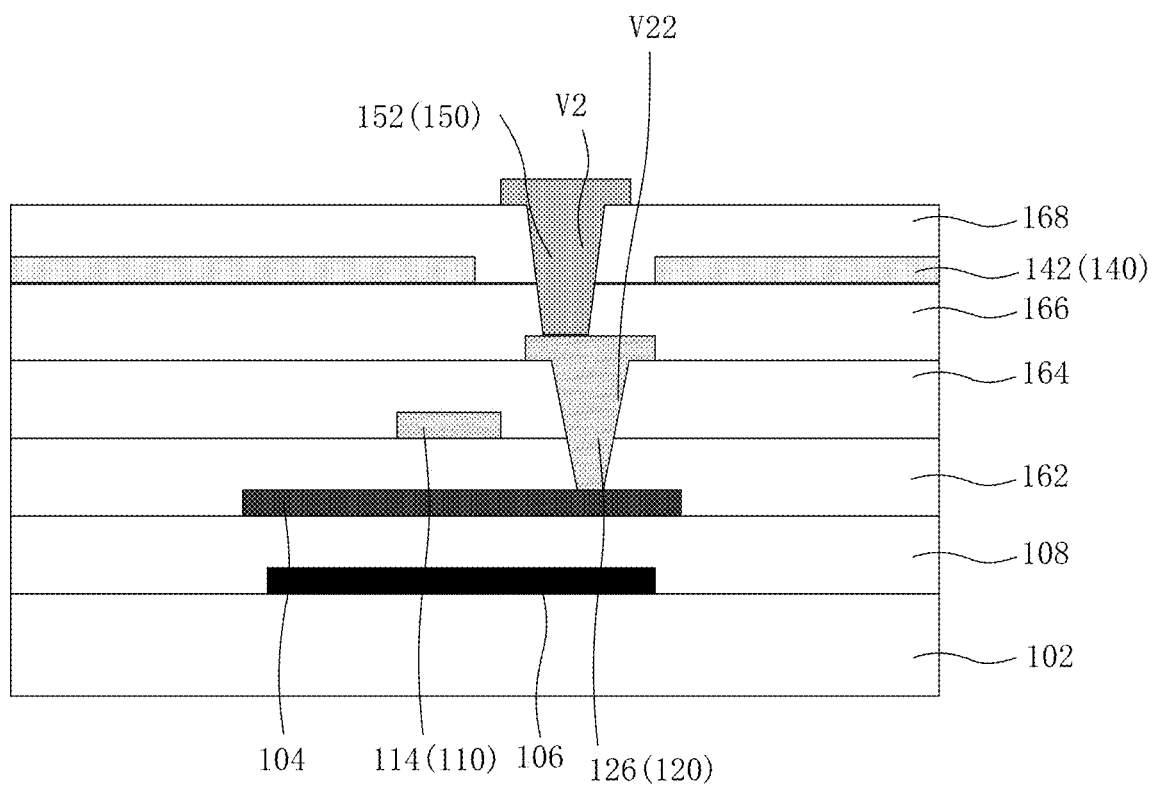
FIG. 18b illustrates a cross-sectional structural schematic diagram of JJ' section in FIG. 17.
Figure 18C:
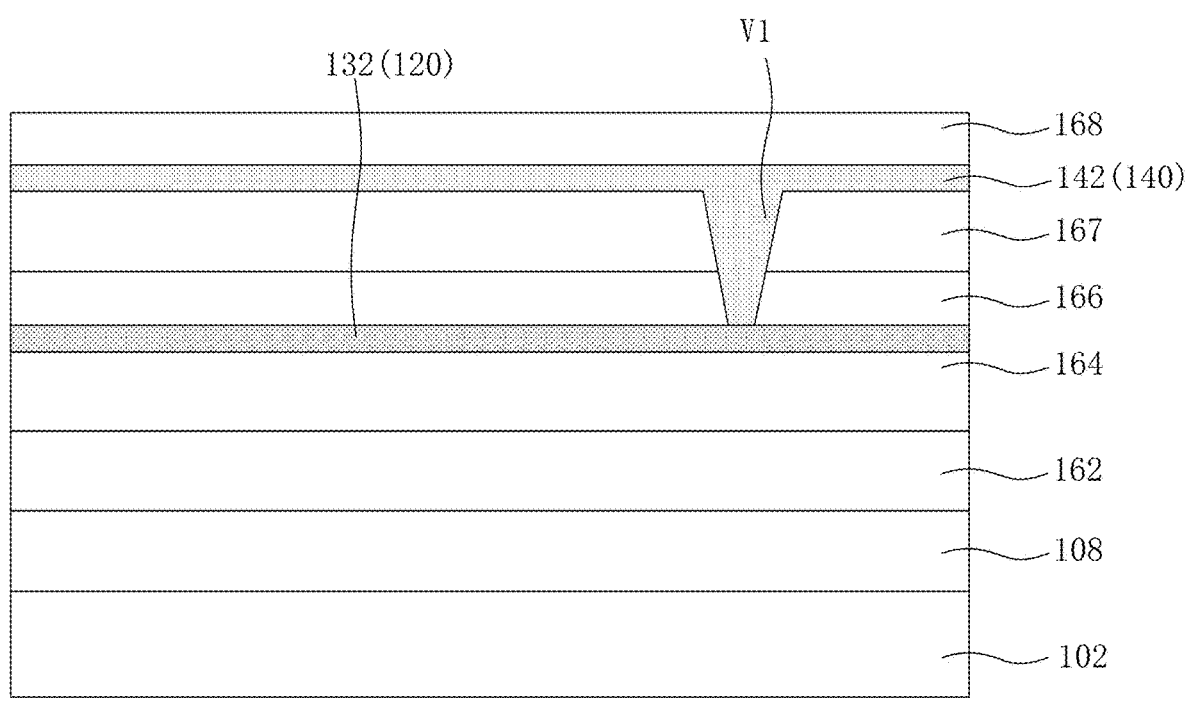
FIG. 18c illustrates a cross-sectional structural schematic diagram of KK' section in FIG. 17.
Figure 18D:
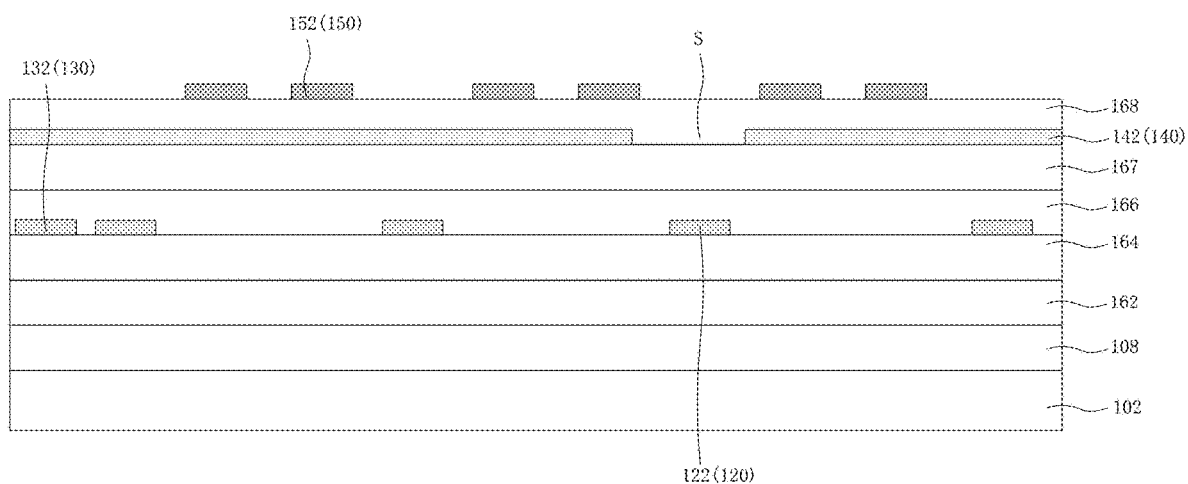
FIG. 18d illustrates a cross-sectional structural schematic diagram of LL' section in FIG. 17.

Similarly, please refer to FIGS. 17-18d, FIG. 17 illustrates another enlarged structural schematic diagram of area D in FIG. 11; FIG. 18a illustrates a cross-sectional structural schematic diagram of II' section in FIG. 17; FIG. 18b illustrates a cross-sectional structural schematic diagram of JJ' section in FIG. 17; FIG. 18c illustrates a cross-sectional structural schematic diagram of KK' section in FIG. 17; and FIG. 18d illustrates a cross-sectional structural schematic diagram of LL' section in FIG. 17. Compared to the structure shown in FIG. 9, the structure shown in FIG. 17 has the following differences: the touch electrode wirings 132 and the data lines 122 are arranged in the same layer. The touch display panel includes a first metal layer 110 arranged on the first glass substrate 102, the first metal layer 110 includes scan lines 112. Optionally, the first metal layer can be directed arranged on a side surface of the first glass substrate facing the color film substrate 200. The first metal layer 100 further includes a gate electrode 114. In other embodiment, the first metal layer 110 may further includes elements such as common electrode wirings, and signal wiring of the non-display area, etc. If the first metal layer 110 includes the common electrode wirings, then the common electrode wirings penetrates through a through hole defined in an insulation layer between the first metal layer and the common electrodes to be electrically connected to the common electrodes 142, thereby reducing transmission resistance of the common electrodes.

A semi-conductor layer 104 is provided between the first glass substrate 102 and the first metal layer 110. The semi-conductor layer 104 is formed at a position corresponding to the gate electrode 114 of each thin film transistor T. In the present embodiment, the semi-conductor layer 104 can be made of low temperature poly-silicon.

A gate electrode insulation layer 162 is provided between the semi-conductor layer 104 and the first metal layer 110, so as to ensure the insulation between the semi-conductor layer 104 and the first metal layer 110.

Further, a light shield layer 106 is provided between the semi-conductor layer 104 and the first glass substrate 102, so as to prevent the back light from influencing the semi-conductor layer 104. The light shield layer 106 can be made of metal or other light-proof materials for blocking the back light. A buffer layer 108 is provided between the light shield layer 106 and the semi-conductor layer 104.

A second metal layer 120 is provided on the first metal layer 110. The second metal layer 120 includes data lines 122 and touch electrode wirings 132. The second metal layer 120 further includes a source electrode 124 and a drain electrode 126 of the thin film transistor T. In other embodiment, the second metal layer 120 may further include signal wiring of the non-display area. The patterning process of the second metal layer 120 is similar to the related art, which will not be described in detail. An interlayer insulation layer 164 is provided between the first metal layer 110 and the second metal layer 120.

A second sub-through-hole V22 is formed in both the interlayer insulation layer 164 and the gate electrode insulation layer 162, so as to expose the drain contact area of the semi-conductor layer 104. The drain electrode 126 is connected to the drain contact area of the semi-conductor layer 104 through the second sub-through-hole V22.

A first passivation layer 166 is provided on the second metal layer 120. A first electrode layer 140 is provided on the first passivation layer 166 and includes common electrodes 142.

An interelectrode insulation layer 168 is provided on the first electrode layer 140. A second through hole V2 is formed in the first passivation layer 166 and the interelectrode insulation layer 168, so as to expose the drain electrode 126.

A second electrode layer 150 is provided on the interelectrode insulation layer 168 and includes a pixel electrode 152.

The pixel electrode 152 is connected to the drain electrode 126 through the second through hole V2.

In the above two embodiments, each touch electrode wiring 132 and the data line 122 are located in a same film layer, therefore, during producing the touch display panel provided by the present disclosure, a same mask process can be adopted to prepare the touch electrode wiring and data line at the same time, so as to reduce processes and improve production capacity. In the range of each sub-pixel P, the common electrode 142 includes a plurality of strip common electrodes 1422 and a plurality of strip common electrode slits 1421. An fringe electric field can be formed between the strip common electrode 1422 and the pixel electrode 152, so as to drive the liquid crystal molecules to rotate. A storage capacitance can be formed at a direct facing area between the strip common electrode 1422 and the pixel electrode 152, so as to improve the stability of the liquid crystal capacitance. In order to expand the angle of view, the strip common electrode 1422 can be arranged to be of a V-shaped structure, so as to form a dual-domain structure, which facilitates the liquid crystal molecules located at different areas of the dual-domain to rotate toward different directions. Further, in order to reduce trace mura, corners are placed on opposite ends of the strip common electrode 1422, so as to strengthen the electric field at the end area of the strip common electrode 1422, thereby improving the driving performance of the electric field of the area.

The slit S between adjacent common electrodes 142 is located above a data line 122, the area can be sheltered by a black matrix on the color film substrate 200, which can avoid the slit between the common electrodes from being formed between the opening areas of the pixel, so as not to influence display. Since no slit is defined in the common electrode above the data line 122, the common electrode above the data line 122 can shelter the parasitic capacitance on the data line 122.

Figure 14:
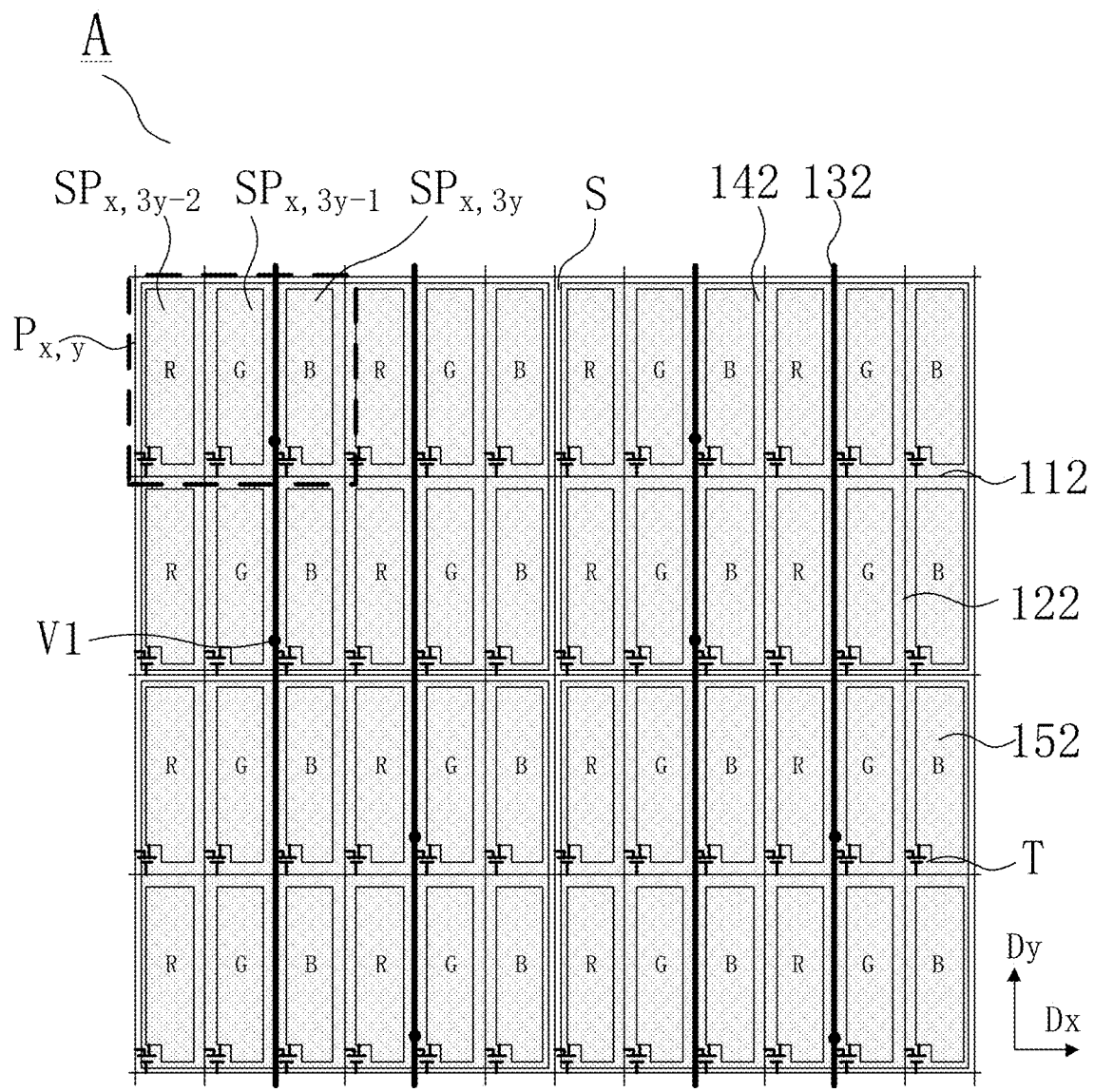
FIG. 14 illustrates another enlarged structural schematic diagram of area A in FIG. 3.

Please refer to FIG. 14, FIG. 14 illustrates another enlarged structural schematic diagram of area A in FIG. 3. The structure of the sub-pixel or pixel group of the embodiment shown in FIG. 14 can be any pixel structure in the above-mentioned embodiments, which will not be repeated herein. The pixel arrangement, that is, the correspondence between the common electrodes and the sub-pixels will be described in detail as follows.

Referring to FIG. 2, FIG. 3 and FIG. 14, another touch display panel provided by an embodiment of the present disclosure includes an array substrate 100 and a color film substrate 200, the array substrate 100 and the color film substrate 200 are fitted by a sealing adhesive 400. The sealing adhesive 400 is arranged at the periphery of the color film substrate 200. A side of the array substrate 100 including the first glass substrate 102 is slightly larger than the second glass substrate 202 of the color film substrate 200, so as to form a step portion, a drive circuit or a drive chip can be arranged on the step portion. The array substrate 100, the color film substrate 200 and the sealing adhesive 400 form a sealed space, a liquid crystal layer 300 is placed in the sealed space. Further, the touch display panel of the present embodiment includes a display area DA and a non-display area NDA, the non-display area NDA surrounds the display area DA, the sealing adhesive 400 is arranged at the non-display area of the touch display panel. The non-display area NDA further includes a step area, a touch drive circuit DC is arranged on the step area.

The array substrate 100 includes a first glass substrate 102, a plurality of scan lines 112 and a plurality of data lines 122. The scan lines 112 extend along a first direction Dx, the data lines 122 extend along a second direction Dy. In the present embodiment, a first metal layer and a second metal layer are arranged on a surface of a side of the first glass substrate 102 facing the color film substrate 200, the scan lines 112 are arranged at the first metal layer, and the data lines 122 are arranged at the second metal layer. The two adjacent scan lines 112 and the two adjacent data lines 122 intersect with each other to define a sub-pixel SP.

The ratio of the long edge to the short edge of the sub-pixel SP is M:1, the adjacent M' sub-pixels SP along the first direction Dx constitute a pixel group P, M' is a rounding off integer of M, and M' is a natural number greater than 1. Referring to FIG. 14, the two adjacent scan lines 112 and the two adjacent data lines 122 intersect with each other to define a sub-pixel SP, the ratio of the long edge to the short edge of the sub-pixel SP is 3:1, that is, in the present embodiment, M=3 and M'=3. In the display process, the pixel group serves as a basic unit to display color, but in the image segmentation process, the pixel group is normally a square. Since the ratio of the long edge to the short edge of the sub-pixel SP is M:1 (in the present embodiment, 3:1), M' sub-pixels SP along a short edge direction of the sub-pixel should constitute a pixel group P, so as to display a mixed color. In the present embodiment, a long edge of the sub-pixel SP extends along an extending direction of the data line 122, i.e., the second direction Dy, the short edge of the sub-pixel SP extends along an extending direction of the scan line 112, i.e., the first direction Dx. Three adjacent sub-pixels SP along the first direction Dx constitute a pixel group. In the present embodiment, any pixel group $P_{x,y}$ includes three sub-pixels, respectively $SP_{x,3y-2}$, $SP_{x,3y-1}$ and $SP_{x,3y}$, x, y are positive integers larger than 1. In other embodiments of the present disclosure, M' can also be other values, for example, M'=2, or M'=4.

A thin film transistor T and a pixel electrode 152 are further placed in each sub-pixel SP area. The thin film transistor T includes a gate electrode, a semi-conductor, a source electrode and a drain electrode. The gate electrode of the thin film transistor T is connected to a corresponding scan line 112, the source electrode of the thin film transistor T is connected to a corresponding data line 122, and the drain electrode of the thin film transistor is connected to the pixel electrode 152 located in the sub-pixel SP area. After the scan line 112 is applied with a start voltage, the semiconductor located on the gate electrode is turned on, at this time, signal transmission function is enabled, then the signal is transmitted from the data line 112 to the pixel electrode 152 electrically connected to the drain electrode.

The array substrate 100 further includes a plurality of block-shaped common electrodes 142 arranged in an In matrix, and I and J are natural numbers greater than or equal to 2. Each common electrode 142 is correspondingly connected to at least one touch electrode wiring 132, each common electrode 142 is connected to the touch drive circuit DC through the touch electrode wiring 132. In the present embodiment, the common electrode 142 is arranged at a surface of a side of a first transparent substrate 102 facing the color film substrate 200. The common electrode 142 is a rectangular common electrode, any two common electrodes 142 are insulated from each other. The common electrode 142 is located in a first electrode layer, and the first electrode layer can be a transparent conductive layer. The adjacent block-shaped common electrodes 142 are insulated from each other by a slit S. The slit S is located between two adjacent sub-pixels SP, and the width of the slit S can be slightly larger than the width of the data line 122, or slightly smaller than the width of the data line 122, or equal to the width of the data line 122 as well. In the display process, a common voltage is applied to each common electrode 142, thus an electric field is formed between the common electrode 142 and the pixel electrode arranged in the sub-pixel SP for driving the liquid crystal molecules in the drive liquid crystal layer 300 to rotate. In the touch process, a touch signal is applied to each common electrode 142, and the touching position can be detected through detecting the self-capacitance change of each common electrode 142 transmitted to the touch drive circuit DC.

The touch display panel provided by the present embodiment also includes a color film substrate 200. The color film substrate 200 includes: a second glass substrate 202; a black matrix 204 including a plurality of open areas, the open areas and the sub-pixels are in one-to-one correspondence; a plurality of color resistors overlapping the plurality of open areas. Referring to FIG. 2, a black matrix 204 is placed on a surface of a side of the second glass substrate 202 facing the array substrate 100, and the black matrix 204 includes a plurality of open areas. The plurality of the open areas and the plurality of the sub-pixels SP on the array substrate 100 are in one-to-one correspondence, since the plurality of sub-pixels SP on the array substrate 100 are arranged in an array, therefore, the plurality of the open areas of the black matrix 204 are also arranged in an array, while the black matrix 204 is distributed in a grid structure. A color resistor 206 is arranged in the open area of the black matrix 204, and the color resistor 206 includes a plurality of colors, for example, a red color resistor, a green color resistor and a blue color resistor. In the present embodiment, there are three types of color resistor, including: red color resistor R, green color resistor G and blue color resistor B.

Referring to FIG. 14, a plurality of color resistors arranged along the first direction Dx includes N colors, and the color resistors of the N colors are sequentially and alternatively arranged in circulation. In the present embodiment, a plurality of color resistors arranged along the first direction Dx includes 3 colors, that is, N=3, which includes a red color resistor R, a green color resistor G and a blue color resistor B. And the 3 colors are sequentially and alternatively arranged in circulation. In addition, the in present embodiment, the arrangement manner of the color resistors of the adjacent two rows of sub-pixels is the same.

Referring to FIG. 14, each common electrode 142 overlaps with k*Z sub-pixels SP in the first direction Dx, k is a positive integer, and Z is the least common multiple of M' and N. In the present embodiment, M'=3, N=3, and Z=3, that is, in the present embodiment, each common electrode 142 overlaps with k*3 sub-pixels in the first direction Dx. It should be noted that, the expression "overlap" herein means that, an orthogonal projection of the common electrode 142 on the first glass substrate 102 is at least partially overlapped with an orthogonal projection of the sub-pixel SP on the first glass substrate 102. In the present embodiment, k will not be limited, which can be any value larger than or equal to 1.

Optionally, in the present embodiment, 32≤k≤108, that is, in the first direction Dx, each common electrode overlaps with 96-324 sub-pixels SP, that is, each common electrode overlaps with 32-108 pixel groups P. Since the width-length ratio of the sub-pixel SP is 3:1, three adjacent sub-pixels SP along the first direction Dx constitute a pixel group P. Therefore, in the second direction Dy, each common electrode overlaps with 32-108 sub-pixels SP, that is, each common electrode overlaps with 32-108 pixels. This is because, the contact area between the finger of a user and the touch display panel is generally within a range of 4 mm*4 mm-5 mm*5 mm, when the common electrode is smaller than 4 mm*4 mm, a single touch will cause capacitance change of multiple adjacent common electrodes 142, and the actual size of multiple common electrodes may be larger than the contact area between the finger and the touch display panel, resulting in an incorrect touch position; when the common electrode is larger than 5 mm*5 mm, the touch position cannot be precisely distinguished due to insufficient accuracy. Taking a common display device as an example, the pixel per inch (Pixel Per Inch, PPI) is in a range of 200-550, the sub-pixel according to the present embodiment has a ratio of the long edge to the short edge being 3:1, and 3 sub-pixels constitute a pixel, when the ppi is in a range of 200-550, the width of the sub-pixel is in a range of 15.4 µm-42.3 µm. As a result, when setting both the length and width of the common electrode to be 4 mm-5 mm, the number of pixel theoretically overlapped in the first direction Dx is in a range of 95-325, and $32 \leq k \leq 108$, the actual number of overlapped sub-pixel is in a range of 96-324. Similarly, it can be calculated that, when the area of the common electrode is in a range of 4 mm*4 mm-5 mm*5 mm, and the ppi is in a range of 200-550, the number of the sub-pixel theoretically overlapped in the second direction Dy is in a range of 32-108. Since the colors of two adjacent rows of pixels are alternatively placed, in order to guarantee that the electric potential is zero when displaying a frame, the number of sub-pixel actually overlapped in the second direction Dy is any even number in a range of 32-108. For example, in the present embodiment, in the first direction Dx, each common electrode 142 can be overlapped with 180 sub-pixels SP, that is, overlapped with 60 pixels P, at this time, k=60 (180/3=60).

The technical effect will be illustrated with reference to the display frame through touch detection. Referring to FIGS. 15a-15d, FIG. 15a illustrates a schematic diagram of a first drive frame of area A in FIG. 14; FIG. 15b illustrates a schematic diagram of a second drive frame of area A in FIG. 14; FIG. 15c illustrates a schematic diagram of a third drive frame of area A in FIG. 14; FIG. 15d illustrates a schematic diagram of a fourth drive frame of area A in FIG. 14.

In order to save debug time, when the frame detection and the touch detection needs to be performed to the display panel at the same time, a special display touch detection frame needs to be input to the touch display panel. The display touch detection frame is presented as: the common electrodes are illuminated in a column interval, the pixels are illuminated in a dot interval. The debug frame is similar with FIGS. 8a-8d, which will not be repeated herein.

Figure 15A:
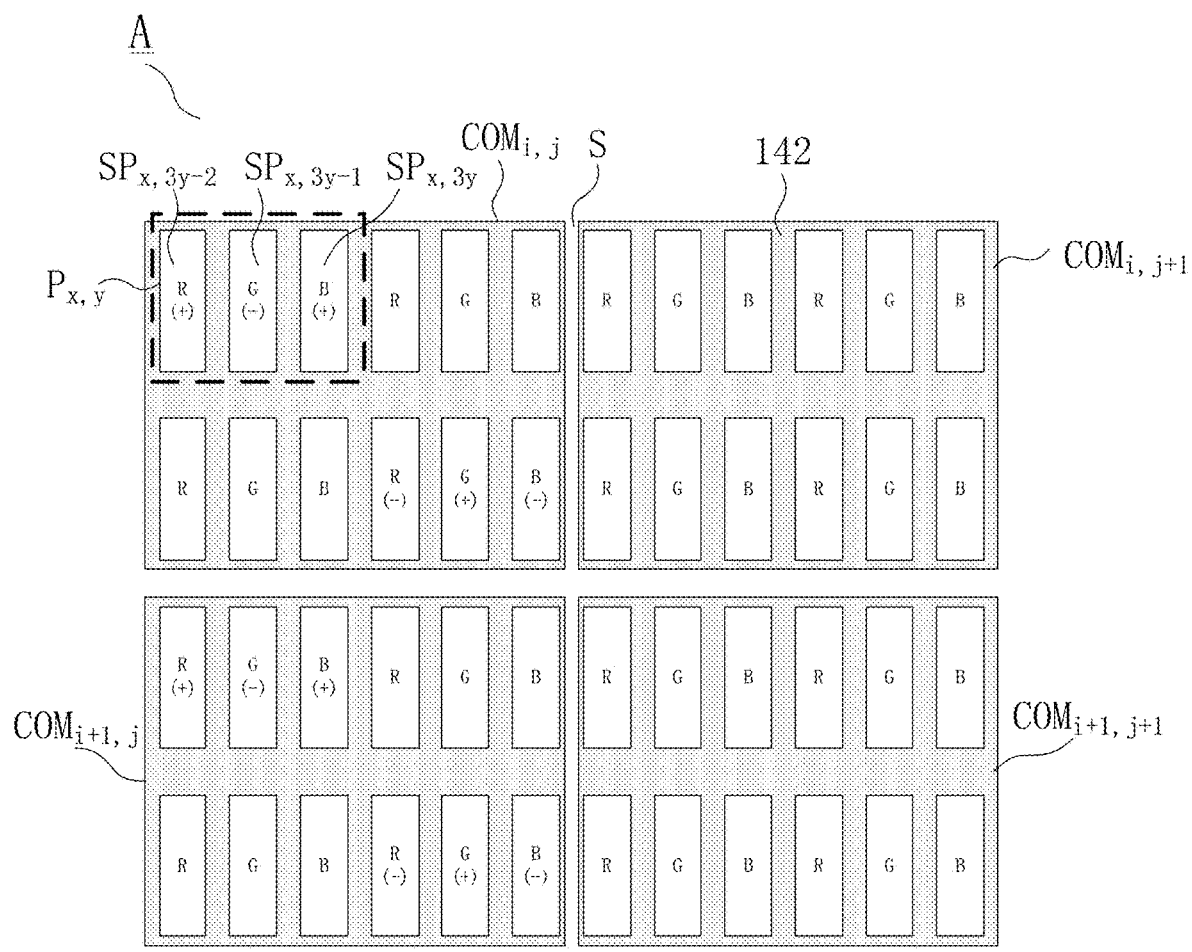
FIG. 15a illustrates a schematic diagram of a first drive frame of area A in FIG. 14.
Figure 15B:
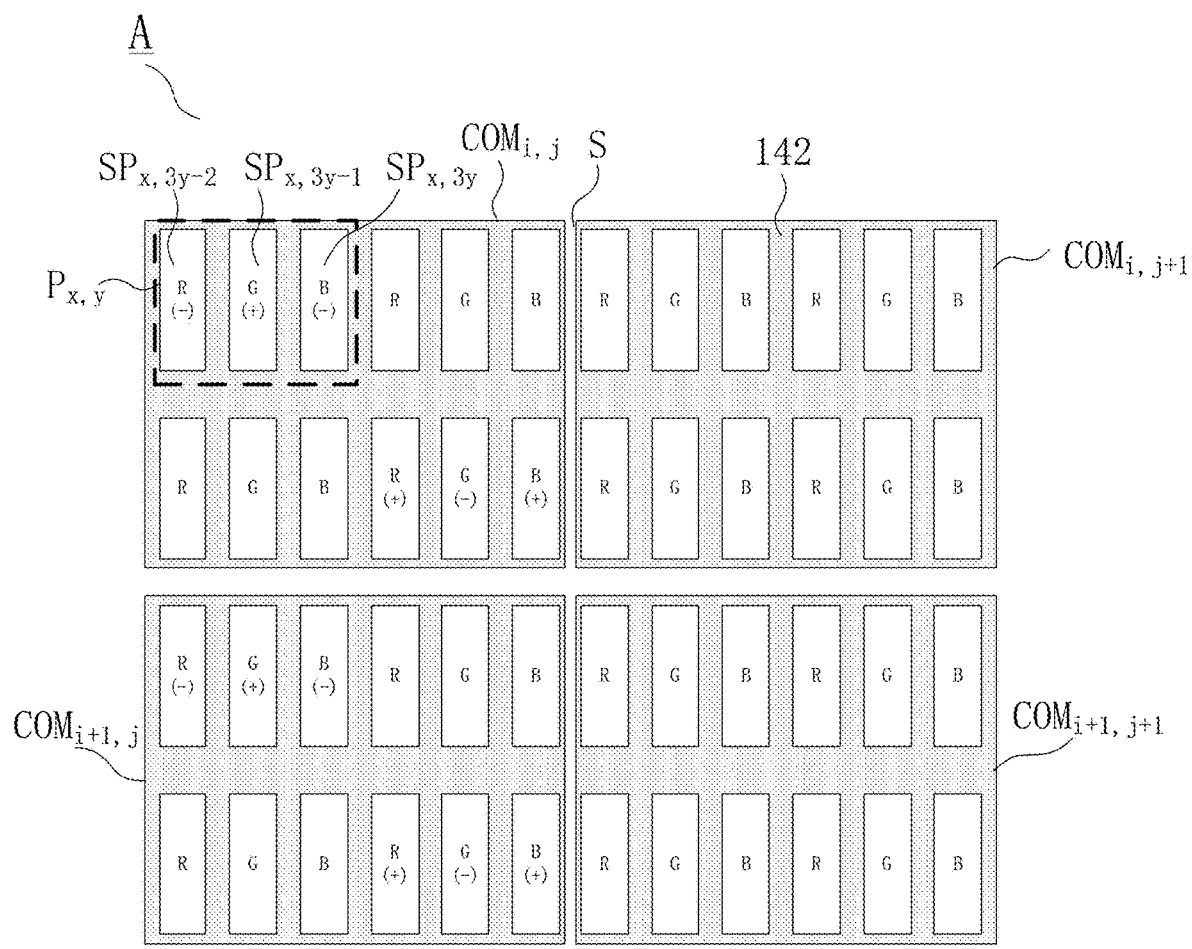
FIG. 15b illustrates a schematic diagram of a second drive frame of area A in FIG. 14.
Figure 15C:
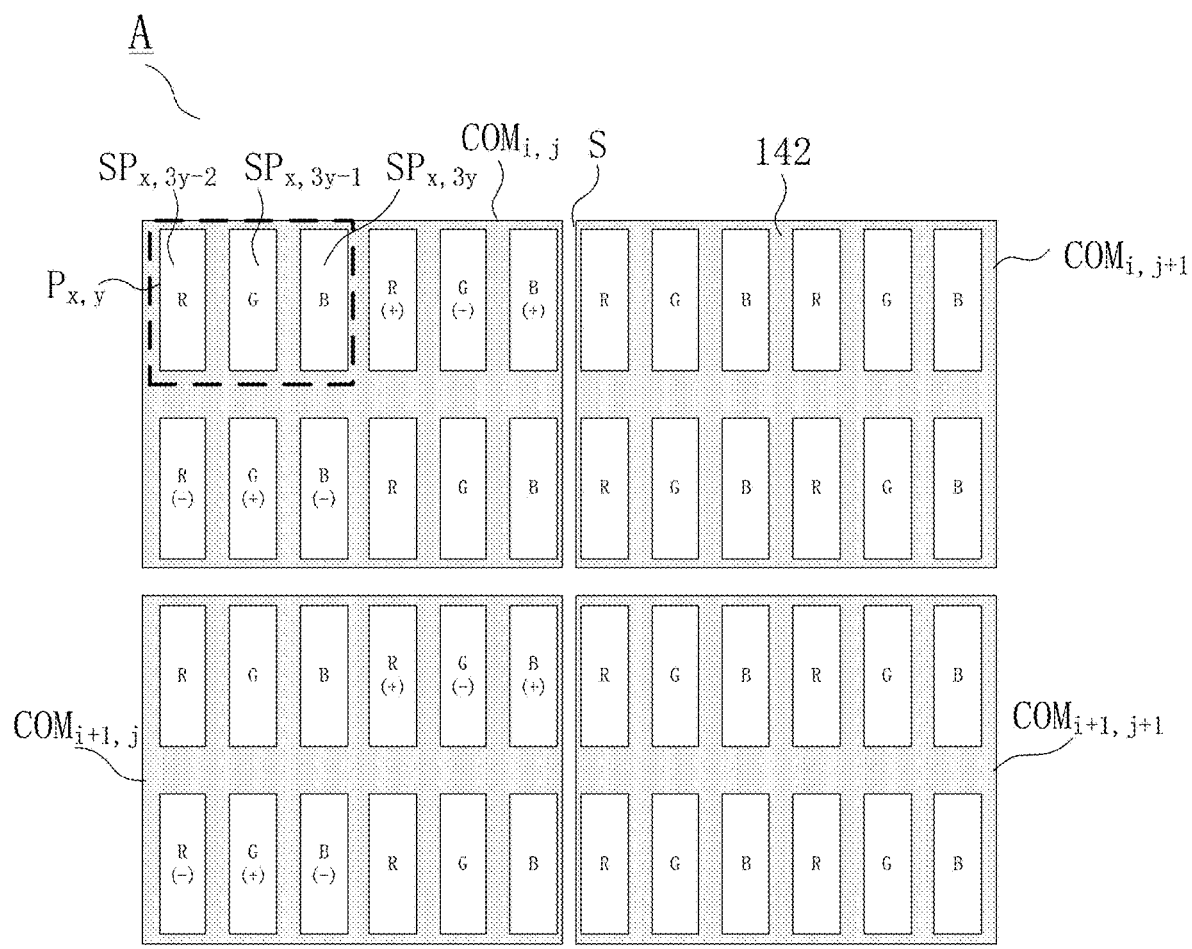
FIG. 15c illustrates a schematic diagram of a third drive frame of area A in FIG. 14.
Figure 15D:
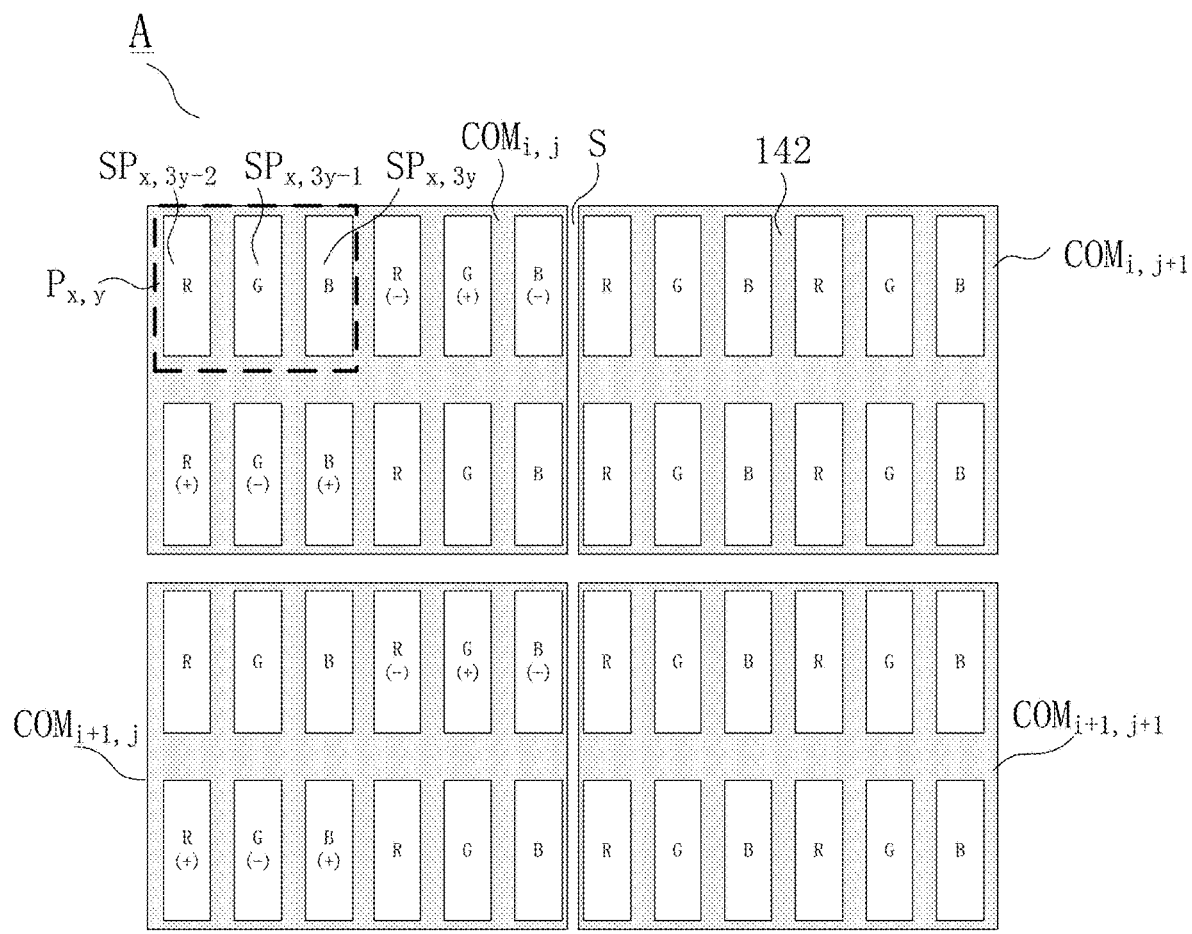
FIG. 15d illustrates a schematic diagram of a fourth drive frame of area A in FIG. 14.

Referring to FIG. 15a and FIG. 15b, which show two driving frames being driven alternatively.

In the present embodiment, since each common electrode covers 3 k sub-pixels in the first direction Dx, it can be guarantee that the display area corresponding to each common electrode displays a uniform gray color while the common electrodes are illuminated in column interval and the pixels are illuminated in dot interval, and the area corresponding to each common electrode can reach a zero electric potential. This is because, in the present embodiment, each pixel group includes three sub-pixels arranged along the first direction Dx, and in the first direction Dx, the sub-pixels of three colors are arranged alternatively, under the situation of a frame that the common electrodes are illuminated in column interval and the pixels are illuminated in dot interval. When each common electrode covers 3 k sub-pixels in the first direction, and covers an even column of sub-pixels in the column direction, it can be guaranteed that, in all the sub-pixels corresponding to each common electrode, the illuminated three colors of sub-pixels have the same number, and the polarities of all the illuminated sub-pixels are counteracted to be zero. As shown in FIG. 15a or FIG. 15b, in FIG. 15a, in the sub-pixels corresponding to the common electrodes in row i and column j, there are 2 red sub-pixels, 2 green sub-pixels and 2 blue sub-pixels, and in the 6 illuminated sub-pixels, there are 3 sub-pixels with positive polarity and 3 sub-pixels with negative polarity. Therefore, the final numbers of sub-pixels of the three colors are the same, and the final frame presents a gray color. In the gray color, flicker of the frame can be visually distinguished. Since the sub-pixels corresponding to each common electrode are electrically neutral, there will not exist parasitic capacitance between adjacent common electrodes. As a result, a poor display due to generation of fringe electric field can be avoided. Since the common electrodes are illuminated in a column interval, when a column of common electrodes is illuminated, touch detection can be performed to the column of common electrodes, through detecting the touch sensitivity of common electrodes in a corresponding column, whether the touch electrodes in the corresponding column have the problems of short circuit, open circuit, decreased touch sensitivity and the like can be detected. Therefore, in a frame, the touch detection and the display detection can be achieved at the same time.

At this time, when each common electrode does not cover 3 k sub-pixels in the first direction, the display touch detection cannot be performed. As an example, when the pixel arrangement according to the present embodiment is adopted, that is, each pixel group includes three sub-pixels in the first direction Dx, and in the first direction Dx, sub-pixels of three different colors are alternatively arranged. As an example, when each common electrode covers 2 k sub-pixels in the first direction, then the numbers of illuminated sub-pixels of different colors corresponding to a common electrode are not identical, the total electric potential will not be zero; when each common electrode covers 4 k sub-pixels in the first direction, the total electric potential will not be zero either, thus the final color will not be gray, therefore, the frame detection cannot be performed. Therefore, only when each common electrode covers 3 k sub-pixels in the first direction, the frame detection can be performed.

After finishing the detection to the first drive frame and the second drive frame, the detection to the third drive frame and the fourth drive frame can be performed. The difference between the detection to the third drive frame and the fourth drive frame and the detection to the first drive frame and the second drive frame only lies in that the driven columns of common electrodes are different, thus the details will not be repeated herein.

In the touch display panel according to the above embodiment, since each common electrode covers 3 k sub-pixels, a signal drive frame can be adopted to perform the touch detection and display detection at the same time, so as to save debug time.

The above contents describe detailed illustration of the present disclosure with reference to the preferred embodiments, which shall not be interpreted as limitations of the present disclosure. For those skilled in the art, any modification or replacements made within the inventive concept of the present disclosure shall fall in the protection scope of the present disclosure.

What is claimed is:

1. A touch display panel, comprising:
an array substrate, the array substrate comprising:
a first glass substrate,
a plurality of scan lines extending along a first direction,
a plurality of data lines extending along a second direction, wherein two adjacent scan lines intersect with two adjacent data lines to define a sub-pixel with a ratio of a long edge to a short edge being M:1, the long edge of the sub-pixel extends along the second direction and the short edge of the sub-pixel extends along the first direction; adjacent M' sub-pixels along the first direction constitute a pixel group, M' is a rounding off integer of M, and M' is a natural number greater than 1, and
a plurality of common electrodes each being block-shaped and arranged in an I*n matrix, wherein each of I and J is a natural number greater than or equal to 2, each of the plurality of common electrodes is correspondingly connected to at least one touch electrode wiring, and each of the plurality of common electrodes is connected to a touch drive circuit by the at least one touch electrode wiring; and
wherein the touch display panel further comprises:
a black matrix comprising a plurality of open areas, each of the plurality of open areas corresponding to a respective sub-pixel, and
a plurality of color resistors comprising N colors, overlapping the plurality of open areas, and arranged along the first direction; wherein the color resistors with N colors are alternatively arranged, N is a natural number greater than 1,
wherein each of the plurality of common electrodes overlaps with k*Z sub-pixels in the first direction, k is a positive integer, and Z is a least common multiple of M' and N.

2. The touch display panel according to claim 1, wherein M'=3, N=3 and Z=3.

3. The touch display panel according to claim 2, wherein 32≤k≤108.

4. The touch display panel according to claim 2, wherein the plurality of color resistors comprises a red color resistor, a green color resistor and a blue color resistor.

5. The touch display panel according to claim 1, wherein M'=3, N=4 and Z=12.

6. The touch display panel according to claim 5, wherein 8≤k≤27.

7. The touch display panel according to claim 5, wherein the plurality of color resistors comprises a red color resistor, a green color resistor, a blue color resistor and a white color resistor.

8. The touch display panel according to claim 7, wherein two adjacent rows of the color resistors along the second direction are arranged by staggering a width of two sub-pixels.

9. The touch display panel according to claim 1, further comprising:
a first metal layer placed on the first glass substrate, the first metal layer comprising the plurality of scan lines;
a gate electrode insulation layer placed on the first metal layer;
a semi-conductor layer placed on the gate electrode insulation layer;
a second metal layer placed on the semi-conductor layer, the second metal layer comprising the plurality of data lines;
a first passivation layer arranged on the second metal layer;
a third metal layer arranged on the first passivation layer, the third metal layer comprising the touch electrode wirings;
a first electrode layer arranged on the first passivation layer, the first electrode layer comprising the common electrodes;
an interelectrode insulation layer arranged on the first electrode layer; and
a second electrode layer arranged on the interelectrode insulation layer, the second electrode layer comprising a pixel electrode.

10. The touch display panel according to claim 1, further comprising:
a semi-conductor layer arranged on the first glass substrate;
a gate electrode insulation layer arranged on the semi-conductor layer;
a first metal layer arranged on the gate electrode insulation layer, the first metal layer comprising the plurality of scan lines;
an interlayer insulation layer arranged on the first metal layer;
a second metal layer arranged on the interlayer insulation layer, the second metal layer comprising the plurality of data lines;
a first passivation layer arranged on the second metal layer;
a third metal layer arranged on the first passivation layer, the third metal layer comprising the touch electrode wirings;
a second passivation layer arranged on the third metal layer;
a first electrode layer arranged on the second passivation layer, the first electrode layer comprising the common electrodes;
an interelectrode insulation layer arranged on the first electrode layer; and
a second electrode layer arranged on the interelectrode insulation layer, the second electrode layer comprising a pixel electrode.

11. The touch display panel according to claim 1, further comprising:
a first metal layer arranged on the first glass substrate, the first metal layer comprising the plurality of scan lines;
a gate electrode insulation layer arranged on the first metal layer;
a semi-conductor layer arranged on the gate electrode insulation layer;
a second electrode layer arranged on the gate electrode insulation layer, the second electrode layer comprising a pixel electrode;
a second metal layer arranged on the semi-conductor layer and the second electrode layer, the second metal layer comprising the plurality of data lines and the touch electrode wirings;
a first passivation layer arranged on the second metal layer; and
a first electrode layer arranged on the first passivation layer, the first electrode layer comprising the common electrodes.

12. The touch display panel according to claim 1, further comprising:
a semi-conductor layer arranged on the first glass substrate;

a gate electrode insulation layer arranged on semi-conductor layer;

a first metal layer arranged on the gate electrode insulation layer, the first metal layer comprising the plurality of scan lines;

an interlayer insulation layer arranged on the first metal layer;

a second metal layer arranged on the interlayer insulation layer, the second metal layer comprising the plurality of data lines and the touch electrode wirings;

a first passivation layer arranged on the second metal layer;

a first electrode layer arranged on the first passivation layer, the first electrode layer comprising a pixel electrode;

an interelectrode insulation layer arranged on the first electrode layer; and a second electrode layer arranged on the interelectrode insulation layer, the second electrode layer comprising the common electrodes.

13. The touch display panel according to claim 1, further comprising:

a color film substrate comprising a second glass substrate;

wherein the black matrix and the plurality of color resistors are arranged on the second glass substrate.

14. The touch display panel according to claim 1, wherein each of the plurality of common electrodes penetrates through a through hole of the interelectrode insulation layer to be electrically connected to a respective one of the touch electrode wirings.

15. The touch display panel according to claim 1, further comprising:

a plurality of redundant touch electrode wirings, wherein at least one of the plurality of redundant touch electrode wirings is connected to a respective one of the plurality of common electrodes, and is insulated from other ones of the plurality of common electrodes.

16. The touch display panel according to claim 1, wherein adjacent common electrodes of the plurality of common electrodes are insulated from each other through a slit, the slit being provided between adjacent two of the sub-pixels.

17. The touch display panel according to claim 16, wherein a width of the slit is greater than or equal to a width of the data line.

18. The touch display panel according to claim 16, wherein a width of the slit is smaller than a width of the data line.

19. The touch display panel according to claim 10, wherein an orthogonal projection of the touch electrode wirings on the first glass substrate overlaps with an orthogonal projection of the data lines on the first glass substrate.

20. The touch display panel according to claim 12, wherein in each of the sub-pixels, the common electrode comprises a plurality of strip-shaped common electrodes and at least one strip-shaped slit.

* * * * *